US011886911B2

(12) United States Patent
Shveidel et al.

(10) Patent No.: US 11,886,911 B2
(45) Date of Patent: Jan. 30, 2024

(54) END-TO-END QUALITY OF SERVICE MECHANISM FOR STORAGE SYSTEM USING PRIORITIZED THREAD QUEUES

(71) Applicant: EMC IP Holding Company LLC, Hopkinton, MA (US)

(72) Inventors: Vladimir Shveidel, Pardes-Hana (IL); Lior Kamran, Rishon LeZion (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 513 days.

(21) Appl. No.: 16/915,380

(22) Filed: Jun. 29, 2020

(65) Prior Publication Data
US 2021/0406066 A1 Dec. 30, 2021

(51) Int. Cl.
*G06F 9/48* (2006.01)
*G06F 9/50* (2006.01)
(Continued)

(52) U.S. Cl.
CPC .......... *G06F 9/4881* (2013.01); *G06F 3/067* (2013.01); *G06F 3/0611* (2013.01);
(Continued)

(58) Field of Classification Search
CPC ...... G06F 9/4881; G06F 3/0659; G06F 3/067; G06F 9/5038; G06F 9/52; G06F 3/0611
See application file for complete search history.

(56) References Cited

U.S. PATENT DOCUMENTS 7,165,155 B1 1/2007 Duprey et al.
7,440,982 B2 10/2008 Lu et al.
(Continued)

FOREIGN PATENT DOCUMENTS

WO 2016111954 A1 7/2016
WO PCT/US2019/024885 1/2020
WO PCT/US2019/024900 1/2020

OTHER PUBLICATIONS

EMC Corporation, "Introduction to the EMC XtremIO Storage Array (Ver. 4.0): A Detailed Review," White Paper, Apr. 2015, 65 pages.
(Continued)

*Primary Examiner* — Emerson C Puente
*Assistant Examiner* — Jonathan R Labud
(74) *Attorney, Agent, or Firm* — Ryan, Mason & Lewis, LLP

(57) ABSTRACT

At least one processing device comprises a processor and a memory coupled to the processor. The at least one processing device is configured to associate different classes of service with respective threads of one or more applications executing on at least one of a plurality of processing cores of a storage system, to configure different sets of prioritized thread queues for respective ones of the different classes of service, to enqueue particular ones of the threads associated with particular ones of the classes of service in corresponding ones of the prioritized thread queues, and to implement different dequeuing policies for selecting particular ones of the enqueued threads from the different sets of prioritized thread queues based at least in part on the different classes of service. The at least one processing device illustratively comprises at least a subset of the plurality of processing cores of the storage system.

20 Claims, 7 Drawing Sheets

(51) Int. Cl.
*G06F 3/06* (2006.01)
*G06F 9/52* (2006.01)

(52) U.S. Cl.
CPC .......... *G06F 3/0659* (2013.01); *G06F 9/5038* (2013.01); *G06F 9/52* (2013.01)

(56) References Cited

U.S. PATENT DOCUMENTS

| | | | |
|---|---|---|---|
| 7,444,464 | B2 | 10/2008 | Urmston et al. |
| 8,095,726 | B1 | 1/2012 | O'Connell et al. |
| 8,214,612 | B1 | 7/2012 | Natanzon |
| 8,301,593 | B2 | 10/2012 | Hoffmann et al. |
| 8,335,899 | B1 | 12/2012 | Meiri et al. |
| 9,104,326 | B2 | 8/2015 | Frank et al. |
| 9,208,162 | B1 | 12/2015 | Hallak et al. |
| 9,286,003 | B1 | 3/2016 | Hallak et al. |
| 9,514,014 | B2 | 12/2016 | Webman et al. |
| 9,552,258 | B2 | 1/2017 | Hallak et al. |
| 9,606,870 | B1 | 3/2017 | Meiri et al. |
| 9,716,754 | B2 | 7/2017 | Swift |
| 9,891,994 | B1 | 2/2018 | Schneider et al. |
| 10,176,046 | B1 | 1/2019 | Hu et al. |
| 10,261,693 | B1 | 4/2019 | Schneider et al. |
| 10,324,640 | B1 | 6/2019 | Chen et al. |
| 10,338,851 | B1 | 7/2019 | Kronrod et al. |
| 10,359,965 | B1 | 7/2019 | Stronge et al. |
| 10,394,485 | B1 | 8/2019 | Chen et al. |
| 10,437,501 | B1 | 10/2019 | Kucherov et al. |
| 10,437,855 | B1 | 10/2019 | Stronge et al. |
| 10,466,925 | B1 | 11/2019 | Blanco et al. |
| 10,496,324 | B2 | 12/2019 | Meiri et al. |
| 10,496,489 | B1 | 12/2019 | Chen et al. |
| 10,496,672 | B2 | 12/2019 | Meiri et al. |
| 10,558,613 | B1 | 2/2020 | Shveidel et al. |
| 10,592,159 | B2 | 3/2020 | Kucherov et al. |
| 10,592,161 | B1 | 3/2020 | Chen et al. |
| 10,606,519 | B1 | 3/2020 | Shveidel |
| 10,684,915 | B2 | 6/2020 | Schneider et al. |
| 10,691,355 | B2 | 6/2020 | Kucherov et al. |
| 10,691,373 | B2 | 6/2020 | Harduf et al. |
| 10,691,551 | B2 | 6/2020 | Meiri et al. |
| 2007/0022121 | A1 | 1/2007 | Bahar et al. |
| 2008/0279462 | A1 | 11/2008 | Celi, Jr. |
| 2009/0132955 | A1 | 5/2009 | Garg et al. |
| 2009/0276593 | A1 | 11/2009 | Jacobson et al. |
| 2010/0179941 | A1 | 7/2010 | Agrawal et al. |
| 2011/0022566 | A1 | 1/2011 | Beaverson et al. |
| 2011/0225123 | A1 | 9/2011 | D'Souza et al. |
| 2012/0124282 | A1 | 5/2012 | Frank et al. |
| 2013/0305002 | A1 | 11/2013 | Hallak et al. |
| 2013/0325824 | A1 | 12/2013 | Shoens |
| 2014/0181016 | A1 | 6/2014 | Whitehead et al. |
| 2014/0244935 | A1 | 8/2014 | Ezra et al. |
| 2015/0347189 | A1* | 12/2015 | Steffen .................. G06F 9/4893 718/103 |
| 2015/0378766 | A1 | 12/2015 | Beveridge et al. |
| 2015/0378785 | A1 | 12/2015 | Tarasuk-Levin et al. |
| 2016/0150012 | A1 | 5/2016 | Barszczak et al. |
| 2016/0170987 | A1 | 6/2016 | Kesselman |
| 2016/0202927 | A1 | 7/2016 | Klarakis et al. |
| 2016/0224259 | A1 | 8/2016 | Ahrens et al. |
| 2016/0261513 | A1 | 9/2016 | Aingaran et al. |
| 2016/0345207 | A1 | 11/2016 | Kwak et al. |
| 2017/0075842 | A1 | 3/2017 | Su et al. |
| 2017/0185529 | A1 | 6/2017 | Chhabra et al. |
| 2017/0192857 | A1 | 7/2017 | Meiri et al. |
| 2018/0095873 | A1 | 4/2018 | Nakagoe et al. |
| 2019/0303490 | A1 | 10/2019 | Chen et al. |
| 2019/0392060 | A1 | 12/2019 | Meiri et al. |
| 2020/0026616 | A1 | 1/2020 | Hu et al. |
| 2020/0097174 | A1 | 3/2020 | Moore et al. |
| 2020/0097363 | A1 | 3/2020 | Moore et al. |
| 2020/0097393 | A1 | 3/2020 | Moore et al. |
| 2020/0125276 | A1 | 4/2020 | Shani et al. |
| 2020/0136943 | A1* | 4/2020 | Banyai .................. H04L 45/70 |
| 2020/0192715 | A1* | 6/2020 | Wang .................. G06F 12/0253 |

OTHER PUBLICATIONS

EMC Corporation, "Unstoppable Data Reduction: Always-on, In-Line, Zero-Penalty, Enterprise-Class, Free," https://store.emc.com/xtremio, Jul. 2014, 2 pages.

EMC Corporation, "Introduction to XtremIO Virtual Copies," White Paper, Mar. 2016, 39 pages.

EMC Corporation, "XtremIO Data Protection (XDP): Flash-Specific Data Protection, Provided by XtremIO (Ver. 4.0)," White Paper, Apr. 2015, 25 pages.

Dell EMC, "XtremIO v6.0 Specifications," Specification Sheet, 2017, 4 pages.

Dell EMC, "Dell EMC XtremIO X2: Next-Generation All-Flash Array," Data Sheet, 2017, 5 pages.

EMC Corporation, "High Availability, Data Protection and Data Integrity in the XtremIO Architecture," White Paper, Apr. 2015, 28 pages.

Dell EMC, "Introduction to Dell EMC XtremIO X2 Storage Array—A Detailed Review," Dell EMC White Paper, Aug. 2017, 46 pages.

N. Tolia et al., "Opportunistic Use of Content Addressable Storage for Distributed File Systems," Proceedings of the USENIX Annual Technical Conference, Jun. 9-14, 2003, 14 pages.

EMC Corporation, "EMC Recoverpoint Replication of XtremIO: Understanding the Essentials of RecoverPoint Snap-Based Replication for XtremIO," EMC White Paper, Aug. 2015, 31 pages.

Dell EMC, "Introduction to Dell EMC XtremIO X2 Storage Array—A Detailed Review," Dell EMC White Paper, Apr. 2018, 52 pages.

Dell EMC, "Introduction to XtremIO Metadata-Aware Replication," Dell EMC White Paper, Apr. 2018, 18 pages.

Dell EMC, "PowerMax OS," Dell EMC PowerMax Family Product Guide, May 2019, 192 pages.

Dell EMC, "Dell EMC VxRack FLEX," Dell EMC Product Overview, 2018, 5 pages.

U.S. Appl. No. 15/662,708, filed in the name of Xiangping Chen et al. Jul. 28, 2017, and entitled "Token-Based Data Flow Control in a Clustered Storage System."

U.S. Appl. No. 15/793,121, filed in the name of David Meiri et al. Oct. 25, 2017, and entitled "Opportunistic Compression of Replicated Data in a Content Addressable Storage System."

U.S. Appl. No. 15/824,536, filed in the name of Christopher Sayles et al. Nov. 28, 2017, and entitled "Storage System with Asynchronous Messaging between Processing Modules for Data Replication."

U.S. Appl. No. 16/253,793, filed in the name of Yuval Harduf et al. Jan. 22, 2019, and entitled "Storage System with Data Consistency Checking in Synchronous Replication Using Active Snapshot Set."

U.S. Appl. No. 16/265,131, filed in the name of Lior Kamran et al. Feb. 1, 2019, and entitled "Storage System with Write Cache Release Protection."

U.S. Appl. No. 16/343,942, filed in the name of Yonatan Shtarkman et al. Apr. 22, 2019, and entitled "Snapshot-Enabled Storage System Implementing Algorithm for Efficient Reclamation of Snapshot Storage Space."

U.S. Appl. No. 16/343,949, filed in the name of Asaf Porath et al. Apr. 22, 2019, and entitled "Snapshot-Enabled Storage System Implementing Algorithm for Efficient Reading of Data from Stored Snapshots."

U.S. Appl. No. 16/396,897, filed in the name of Anton Kucherov et al. Apr. 29, 2019, and entitled "Storage System with Deduplication-Aware Replication Implemented Using a Standard Storage Command Protocol."

U.S. Appl. No. 16/413,050, filed in the name of Xiangping Chen et al. May 15, 2019, and entitled "Storage System with Coordinated Recovery across Multiple Input-Output Journals of Different Types."

U.S. Appl. No. 16/530,121, filed in the name of Anton Kucherov et al. Aug. 2, 2019, and entitled "Memory-Efficient Processing of Raid Metadata Bitmaps."

(56) References Cited

OTHER PUBLICATIONS

U.S. Appl. No. 16/663,524, filed in the name of Xiangping Chen et al. Oct. 25, 2019, and entitled "Storage System with Throughput-Based Timing of Synchronous Replication Recovery."
U.S. Appl. No. 16/665,651, filed in the name of Lior Kamran et al. Oct. 28, 2019, and entitled "Recovery Flow with Reduced Address Lock Contention in a Content Addressable Storage System."
U.S. Appl. No. 16/671,824, filed in the name of Lior Kamran et al. Nov. 1, 2019, and entitled "Storage System Capacity Expansion Using Mixed-Capacity Storage Devices."
U.S. Appl. No. 16/693,858, filed in the name of Doron Tal Nov. 25, 2019, and entitled "Storage System with Prioritized RAID Rebuild."
U.S. Appl. No. 16/747,138, filed in the name of Lior Kamran et al. Jan. 20, 2020, and entitled "Performance Monitoring for Storage System with Core Thread Comprising Internal and External Schedulers."
U.S. Appl. No. 16/747,689, filed in the name of Alex Soukhman et al. Jan. 21, 2020, and entitled "Persistence Points Based Coverage Mechanism for Flow Testing in High-Performance Storage Systems."
U.S. Appl. No. 16/894,973, filed in the name of Alex Soukhman et al. Jun. 8, 2020, and entitled "Dynamic Modification of IO Shaping Mechanisms of Multiple Storage Nodes in a Distributed Storage System."

* cited by examiner

END-TO-END QUALITY OF SERVICE MECHANISM FOR STORAGE SYSTEM USING PRIORITIZED THREAD QUEUES

FIELD

The field relates generally to information processing systems, and more particularly to storage in information processing systems.

BACKGROUND

Information processing systems often include distributed storage systems comprising multiple nodes. Nodes of a distributed storage system may each include multi-core processors that are configured to execute threads associated with various applications. One or more processing cores of a given such multi-core processor illustratively execute the threads associated with a particular application. In some instances, an application may utilize an always-polling model in which threads executing on one or more processing cores poll interfaces of the information processing system for new tasks, events, or other data. In other instances, an application may use an event-driven model in which interrupts are used to activate threads for processing a task, event or other data using the one or more processing cores. Performance monitoring techniques are typically used to monitor the performance of such core threads in these and other contexts, but excessive latencies may nonetheless arise when a given processing core is used to execute multiple threads of different applications. A need therefore exists for limiting latency or providing other performance guarantees in conjunction with threads executing on one or more processing cores in a distributed storage system.

SUMMARY

Illustrative embodiments provide end-to-end quality of service (QoS) mechanisms for storage systems using prioritized thread queues. Some embodiments disclosed herein are advantageously configured to facilitate provision of effective QoS guarantees for IO operations in a storage system in which one or more processing cores of the storage system are used to execute multiple threads of different applications. For example, one or more illustrative embodiments are configured to provide multiple distinct classes of service for respective different sub-threads of one or more threads of at least one primary storage application executing on a processing core, even in situations in which one or more threads of one or more other applications are executing on the same processing core.

In one embodiment, at least one processing device comprises a processor coupled to a memory, and is configured to associate different classes of service with respective threads of one or more applications executing on at least one of a plurality of processing cores of a storage system, to configure different sets of prioritized thread queues for respective ones of the different classes of service, to enqueue particular ones of the threads associated with particular ones of the classes of service in corresponding ones of the prioritized thread queues, and to implement different dequeuing policies for selecting particular ones of the enqueued threads from the different sets of prioritized thread queues based at least in part on the different classes of service.

The processing device in some embodiments comprises at least a subset of the plurality of processing cores of the storage system, although other arrangements are possible.

In some embodiments, the threads of the one or more applications executing on at least one of a plurality of processing cores of the storage system illustratively comprise different sub-threads of a first thread of a first application executing on a particular one of the plurality of processing cores of a storage system.

For example, the first application may comprise a block-storage application of the storage system and the first thread may comprise a truck thread that when executing on the particular processing core is configured to utilize substantially all available processing resources of that processing core.

Each of the sub-threads of the first thread may be in one of multiple designated states at a particular point in time, such as, for example, a running state, a ready state and a suspended state. Additional or alternative states may be used in other embodiments.

In some embodiments, different ones of the sub-threads that are in the suspended state are illustratively enqueued in respective different ones of the prioritized thread queues in order to wait for access to respective corresponding synchronization objects associated with resources of the particular processing core.

In some embodiments, associating different classes of service with respective threads of one or more applications comprises assigning designated class tags as attributes of the respective threads wherein different ones of the class tags denote respective different ones of the classes of service.

For example, the at least one processing device in some embodiments is further configured to receive an input-output (TO) operation for processing, to assign a particular one of the class tags to the IO operation, and to assign the particular one of the class tags to each of a plurality of threads that are generated in conjunction with the processing of the IO operation. The assignment of the particular one of the class tags to the IO operation is illustratively persistent throughout the processing of the IO operation.

The processing of the IO operation in some embodiments is distributed across a plurality of distinct storage nodes of the storage system, with each such storage node comprising one or more of the plurality of processing cores of the storage system. In such an embodiment, the assigned class tag for the IO operation is illustratively passed from a first one of the storage nodes to a second one of the storage nodes in conjunction with the processing of the IO operation and is assigned to one or more threads generated in the second storage node for the processing of the IO operation.

In some embodiments, the different sets of prioritized thread queues configured for respective ones of the different classes of service provide different dynamically adjustable latency levels for the threads that are enqueued therein.

In some embodiments, uniform sets of prioritized thread queues are provided for respective ones of a plurality of different synchronization objects. Each of the synchronization objects may comprise, for example, one or more of a semaphore, a timer, a lock, a barrier, a memory pool and a thread pool, although other types and arrangements of synchronization objects are possible. A single non-prioritized thread queue of a given one of the synchronization objects is illustratively replaced with multiple thread queues and priority-based selection among the multiple thread queues for the given synchronization object.

In some embodiments, configuring different sets of prioritized thread queues for respective ones of the different classes of service illustratively comprises determining a number of priority classes, determining a number of selection indexes for respective ones of the priority classes, and establishing a particular number of prioritized thread queues based at least in part on the number of priority classes and the number of selection indexes. The selection indexes may comprise, for example, round robin indexes.

Additionally or alternatively, configuring different sets of prioritized thread queues for respective ones of the different classes of service illustratively comprises determining a number of priority classes, establishing a set of prioritized thread queues for each of the priority classes, and assigning weights to respective ones of the sets of prioritized thread queues of the respective priority classes. The prioritized thread queues within a given one of the sets illustratively each have a same priority for selection of threads enqueued therein, and different ones of the prioritized thread queues in different ones of the sets illustratively have different priorities for selection of threads enqueued therein.

These and other illustrative embodiments include, without limitation, apparatus, systems, methods and processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
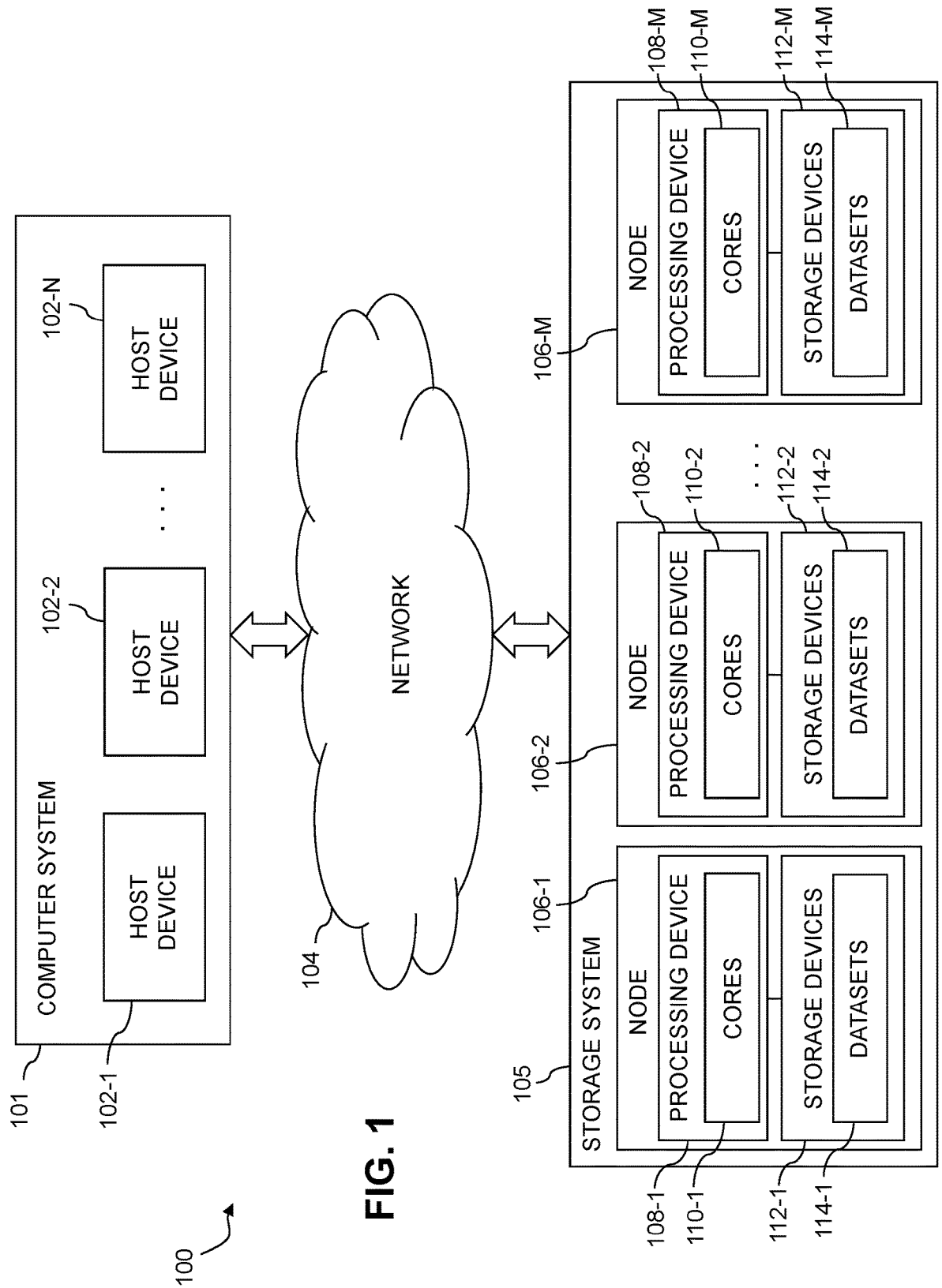
FIG. 1 is a block diagram of an information processing system comprising a storage system configured with an end-to-end QoS mechanism using prioritized thread queues in an illustrative embodiment.

FIG. 1 shows an information processing system 100 configured in accordance with an illustrative embodiment.

The information processing system 100 comprises a computer system 101 that includes host devices 102-1, 102-2, . . . 102-N, collectively referred to herein as host devices 102. The host devices 102 communicate over a network 104 with a storage system 105. The storage system 105 is illustratively configured to implement one or more end-to-end QoS mechanisms using prioritized thread queues.

The computer system 101 is assumed to comprise an enterprise computer system, cloud-based computer system or other arrangement of multiple compute nodes associated with respective users. The host devices 102 of the computer system 101 in some embodiments illustratively provide compute services such as execution of one or more applications on behalf of each of one or more users associated with respective ones of the host devices 102. Such applications illustratively generate input-output (IO) operations that are processed by the storage system 105. The term "input-output" as used herein refers to at least one of input and output. For example, IO operations may comprise write requests and/or read requests directed to logical addresses of a particular logical storage volume of the storage system 105. These and other types of IO operations are also generally referred to herein as IO requests.

The host devices 102 and storage system 105 illustratively comprise respective processing devices of one or more processing platforms. For example, the host devices 102 and the storage system 105 can each comprise one or more processing devices each comprising a processor and a memory, possibly implementing virtual machines and/or containers, although numerous other configurations are possible.

The host devices 102 and the storage system 105 can additionally or alternatively be part of cloud infrastructure such as an Amazon Web Services (AWS) system. Other examples of cloud-based systems that can be used to provide one or more of host devices 102 and storage system 105 include Google Cloud Platform (GCP) and Microsoft Azure.

The host devices 102 and the storage system 105 may be implemented on a common processing platform, or on separate processing platforms.

The host devices 102 are configured to write data to and read data from the storage system 105 in accordance with applications executing on those host devices 102 for system users.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network such as a 4G or 5G network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The storage system 105 is accessible to the host devices 102 over the network 104. The storage system 105 comprises a plurality of nodes 106-1, 106-2, . . . 106-M, collectively referred to herein as nodes 106. The storage system 105 comprising nodes 106 is an example of what is also referred to herein as a "distributed storage system" or a "clustered storage system." For example, in some implementations of storage system 105, the nodes 106 are interconnected in a full mesh network, such that each of the nodes 106 can communicate with each of the other nodes 106, although other types of networks and different node interconnection arrangements can be used in other embodiments. At least portions of respective ones of the nodes 106 illustratively implement what is generally referred to herein as a "distributed storage controller" of the storage system 105.

In the FIG. 1 embodiment, the nodes 106-1, 106-2, . . . 106-M of the storage system 105 comprise respective processing devices 108-1, 108-2, . . . 108-M, collectively referred to herein as processing devices 108. One or more of the nodes 106 may each comprise multiple processing devices 108, although only single instances of such processing devices are shown in the figure. In some embodiments, multiple processing devices 108 of a given one of the nodes 106 may act or function as a single processing device 108.

The processing devices 108-1, 108-2, . . . 108-M comprise respective sets of cores 110-1, 110-2, . . . 110-M, collectively referred to herein as cores 110. For example, a given processing device 108 may comprise a set of two cores 110, four cores 110, eight cores 110, or any other number of cores 110 appropriate to a given implementation. The processing devices 108 therefore each illustratively comprise a multi-core processor and associated memory.

The nodes 106-1, 106-2, . . . 106-M further comprise respective sets of storage devices 112-1, 112-2, . . . 112-M, collectively referred to herein as storage devices 112. For example, a given one of the nodes 106 may comprise a single storage device 112, two storage devices 112, four storage devices 112, eight storage devices 112, sixteen storage devices 112, thirty-two storage devices 112 or any other number of storage devices 112. The storage devices 112-1, 112-2, . . . 112-M store respective datasets 114-1, 114-2, . . . 114-M, collectively referred to herein as datasets 114, which illustratively comprise logical units (LUNs) or other types of logical storage volumes, as well as snapshots and/or other arrangements of data, possibly including associated metadata, as in an embodiment in which storage devices 112 store user data pages and metadata pages of LUNs or other logical storage volumes.

The storage devices 112 of the storage system 105 illustratively comprise solid state drives (SSDs). Such SSDs are implemented using non-volatile memory (NVM) devices such as flash memory. Other types of NVM devices that can be used to implement at least a portion of the storage devices 112 include non-volatile random access memory (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of NVM devices may also be used. For example, hard disk drives (HDDs) can be used in combination with or in place of SSDs or other types of NVM devices.

However, it is to be appreciated that other types of storage devices can be used in storage system 105 in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices.

In some embodiments, the storage system 105 illustratively comprises a scale-out all-flash content addressable storage array such as an XtremIO™ storage array from Dell EMC of Hopkinton, Masschusetts. A wide variety of other types of storage arrays can be used in implementing the storage system 105 in other embodiments, including by way of example one or more VNX®, VMAX®, Unity™ or PowerMax™ storage arrays, each commercially available from Dell EMC.

Additional or alternative types of storage products that can be used in implementing a given storage system in illustrative embodiments include, by way of example, software-defined storage, cloud storage, object-based storage and scale-out storage. Combinations of multiple ones of these and other storage types can also be used in implementing a given storage system in an illustrative embodiment.

The term "storage system" as used herein is therefore intended to be broadly construed, and should not be viewed as being limited to storage systems based on flash memory or other types of NVM storage devices. A given storage system as the term is broadly used herein can comprise, for example, network-attached storage (NAS), storage area networks (SANs), direct-attached storage (DAS) and distributed DAS, as well as combinations of these and other storage types, including software-defined storage.

The storage system 105 should also be understood to include additional modules and other components typically found in conventional implementations of storage systems, although such additional modules and other components are omitted from the figure for clarity and simplicity of illustration.

In some embodiments, communications between the host devices 102 and the storage system 105 comprise Small Computer System Interface (SCSI) or Internet SCSI (iSCSI) commands. Other types of SCSI or non-SCSI commands may be used in other embodiments, including commands that are part of a standard command set, or custom commands such as a "vendor unique command" or VU command that is not part of a standard command set. The term "command" as used herein is therefore intended to be broadly construed, so as to encompass, for example, a composite command that comprises a combination of multiple individual commands. Numerous other commands can be used in other embodiments.

For example, although in some embodiments certain commands used by the host devices 102 to communicate with the storage system 105 illustratively comprise SCSI or iSCSI commands, other embodiments can implement IO operations utilizing command features and functionality associated with NVM Express (NVMe), as described in the NVMe Specification, Revision 1.3, May 2017, which is incorporated by reference herein in its entirety. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

As indicated previously, the host devices 102 and the storage system 105 may be implemented on respective distinct processing platforms, although numerous other arrangements are possible. For example, in some embodiments at least portions of the host devices 102 and the storage system 105 are implemented on the same processing platform. The storage system 105 can therefore be implemented at least in part within at least one processing platform that implements at least a portion of the host devices 102. In the FIG. 1 embodiment, storage system 105 is implemented as a distributed or clustered storage system comprising nodes 106 that may be logically or physically distributed.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host devices 102 and storage system 105 to reside in different data centers. Numerous other distributed implementations of one or both of the host devices 102 and the storage system 105 are possible. Accordingly, the storage system 105 can also be implemented in a distributed manner across multiple data centers.

Additional examples of processing platforms utilized to implement host devices and/or storage systems in illustrative embodiments will be described in more detail below in conjunction with FIGS. 6 and 7.

It is to be appreciated that the above-described features and other features of illustrative embodiments disclosed herein are presented by way of example only and should not be construed as limiting in any way.

The particular sets of modules and other components implemented in the system 100 as illustrated in FIG. 1 are therefore presented by way of illustrative example only. In other embodiments, only subsets of these components, or additional or alternative sets of components, may be used, and such components may exhibit alternative functionality and configurations. Accordingly, different numbers, types and arrangements of system components such as host devices 102, network 104, storage system 105, nodes 106, processing devices 108, cores 110, storage devices 112, and datasets 114, or additional or alternative components, can be used in other embodiments.

Also, in some embodiments, an end-to-end QoS mechanism using prioritized thread queues as disclosed herein can be implemented at least in part in one or more host devices, or partially in a host device and partially in a storage system. Accordingly, illustrative embodiments are not limited to arrangements in which all such functionality is implemented in a storage system, and therefore encompass various hybrid arrangements in which the functionality is distributed over one or more storage systems and one or more associated host devices, each comprising one or more processing devices.

Figure 2:
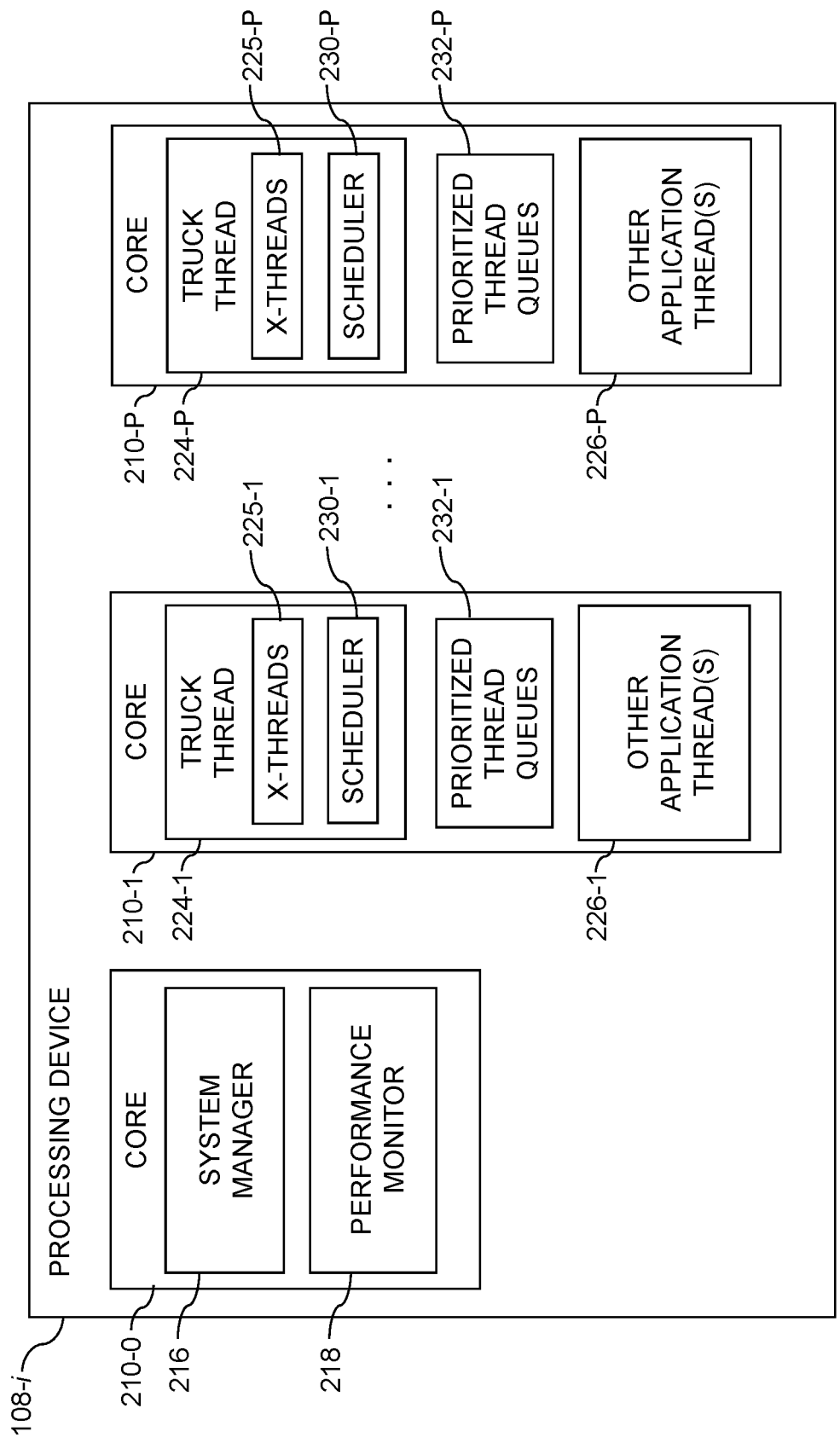
FIG. 2 is a block diagram of a processing device of the information processing system of FIG. 1 comprising a plurality of processing cores having respective sets of prioritized thread queues in an illustrative embodiment.

Referring now to FIG. 2, a given one of the processing devices 108, denoted as processing device 108-$i$, where i=1, 2, . . . M, is shown in more detail. The processing device 108-$i$ in this embodiment comprises a multi-core processor including processing cores 210-0, 210-1, . . . 210-P. The processing core 210-0 implements a system manager 216 and a performance monitor 218. The other processing cores 210-1 through 210-P execute respective truck threads 224-1 through 224-P, comprising respective sets of multiple sub-threads illustratively in the form of X-threads 225-1 through 225-P. Other types of sub-threads can be used in other embodiments. The processing cores 210-1 through 210-P also execute respective sets of one or more other application threads 226-1 through 226-P. These and other threads illustratively comprise operating system (OS) threads of their respective cores 210.

For example, in the case of a block-storage application, which handles the block-based storage functionality of the storage system 105, the block-storage application executes truck threads 224 on respective ones of the cores 210 of the processing device 108-$i$. These truck threads 224 implement the block-storage application functionality. In some embodiments, each of the truck threads 224 may be hard affined to a particular one of the processing cores 210, such that it may only execute on that particular core.

The processing cores 210 in some embodiments illustratively comprise respective distinct central processing units (CPUs). Accordingly, each of the processing devices 108 of the respective nodes 106 of storage system 105 may be viewed as comprising a multi-core CPU and an associated storage array comprising a set of storage devices 112, although numerous other arrangements are possible. The storage array or other arrangement of storage devices 112 associated with a given one of the nodes 106 may comprise, for example, a disk array enclosure (DAE), although such references herein to "disks" should not be construed as an indication that the storage devices are limited to HDDs or other rotating magnetic storage media.

The above-noted multi-core CPU illustratively runs the block-storage application on top of a preemptive OS, where a preemptive OS can preempt (e.g., stop) a running OS thread without its cooperation, and execute something else, such as another OS thread. The block-storage application is illustratively running a single hard-affined OS thread per each CPU core, which implements the block-storage functionality. This OS thread is an example of what is also referred to herein as a "truck thread." Truck threads and other application threads running on a given CPU core or other processing core are more generally referred to herein as "core threads" of that processing core.

As part of its operation, each of the truck threads 224 polls a corresponding set of interfaces of the storage system 105 for tasks, events, or other data to be processed by that truck thread. For example, the set of interfaces may include an interface for indications of completions of submitted IO requests, an interface for IO requests from the user, and interfaces for other tasks, events, or other data. Any other interfaces may also be polled. Each truck thread, by design, fully utilizes the processing core that it is executing on for both interface polling and processing of the corresponding tasks, events, or other data. For example, in illustrative embodiments, each truck thread is designed to fully utilize the processing core that it is executing on because, even when there is no actual processing of tasks to be performed, the truck thread continues checking its respective interfaces via polling. This design is optimized for a storage system that requires low latency and high IO operations per second (IOPS) since no context switches or interrupts are required to perform the processing. In some embodiments, the functionality of the block-storage application may be described as an always-polling model.

In some embodiments, example interfaces that may be polled by a truck thread may include a front-end interface, a remote procedure call (RPC) messaging interface, a remote direct memory access (RDMA) messaging interface, and a back-end interface. In some embodiments, any other interface commonly used in a storage system may also be polled by the truck thread. In some embodiments, each truck thread defines an IO-provider instance for each corresponding interface that it is responsible for polling.

The front-end interface illustratively comprises an interface for receiving and replying to IO requests from users of the storage system 105 associated with respective ones of the host devices 102. For example, a given truck thread may comprise a front-end IO-provider instance that polls for new IO requests from one or more host devices 102 or other system users. In some embodiments, for example, IO requests received by the storage system 105 from the user are pooled together in a common pool that is shared between the truck threads 224 and accessed using a front-end IO-provider instance.

The RPC messaging interface illustratively comprises an interface for sending and receiving messages to and from other nodes 106 of the storage system 105. For example, a given truck thread may comprise an RPC messaging IO-provider that polls for new messages from other nodes 106 in the storage system 105. As an example, when one of the nodes 106 sends an IO request to another one of the nodes 106, the sender node selects the specific destination truck thread, that is, the truck thread that will receive and handle the request.

The RDMA messaging interface illustratively comprises an interface for RDMA transfer of buffers between nodes 106. For example, a given truck thread may comprise an RDMA messaging IO-provider that polls for the completion of RDMA transfers between nodes 106.

The back-end interface illustratively comprises an interface for accessing the storage devices 112 in order to write data to and read data from the storage devices 112. For example, a given truck thread may comprise a back-end IO-provider that polls for the completion of write and read requests initiated by the truck thread to one or more of the storage devices 112 of processing device 108-i.

In some cases, the storage system 105 may also implement one or more other applications aside from the block-storage application. For example, a file-storage application that provides a file interface to a user of the information processing system 100 may also be implemented by the storage system 105, for example, by executing corresponding threads 226 on one or more of the cores 210. In some cases, the block-storage application and the file-storage application, or any other application, may be implemented by the storage system 105 simultaneously, each with a different load that can dynamically change over time.

Since these applications are attempting to utilize the same set of processing cores 210 simultaneously, management of the available processing resources of these cores 210 between the applications can be challenging. For example, since the block-storage application is implemented by executing truck threads 224 on each of the processing cores 210 of each of the nodes 106, and these truck threads 224 can utilize the full capacity of those processing cores 210, little to no processing resources of the storage system 105 may be available for use by threads 226 of another application.

In some embodiments, if only the file-storage application is actively in use, such that no tasks, events, or other data are present for the truck threads 224 to process, the associated file threads may only be able to utilize a portion of the processing resources of a core, such as 50% or another percentage, where the remaining portion, such as the other 50% or another percentage, will be used by the truck threads 224 just for polling interfaces. In cases where the block-storage application is actively performing operations, the truck threads 224 will utilize a substantial portion of the processing resources of the cores, such as 90%, 95%, or even 100%, to both poll the interfaces and process any tasks, events, or other data found on those interfaces during the polling, which leaves little to no processing resources available on those cores for use by other applications such as a file-storage application.

Examples of storage systems that allow the full processing resources of a core to be available for use by other applications, even when a truck thread of a block-storage application is utilizing that core to support its functionality, are disclosed in U.S. patent application Ser. No. 16/251,779, filed Jan. 18, 2019 and entitled "Multi-Core Processor in Storage System Executing Dedicated Polling Thread for Increased Core Availability," which is incorporated by reference herein in its entirety. This patent application more particularly discloses a storage system that in one or more illustrative embodiments is able to dynamically adapt to the user operation patterns of multiple simultaneously implemented applications where, for example, one of the applications executes an always-polling model of functionality that consumes significant processing resources using the above-described truck threads.

Additionally, techniques are disclosed in the above-cited U.S. patent application Ser. No. 16/251,779 for creating an event-driven storage system out of a storage system implementing the above-described always-polling model, through the use of a dedicated peek-poller thread. The dedicated peek-poller thread serves as a mechanism to allow for the sharing of the full resources of the other cores in a processing device between the two or more applications in a manner that dynamically matches the user operation pattern. For example, the dedicated peek-poller thread is executed on a core of the processing device and partially replaces the polling functionality of each of the truck threads executing on the other cores in the processing device, thereby freeing up the processing resources of those other cores that would otherwise be used by the truck threads for polling for use by other applications during times when the block-storage application is experiencing reduced activity.

However, a situation may arise where, for example, the block-storage application is utilizing the full resources of the processing cores 210 such that having a dedicated peek-poller thread executing on one of the cores 210 reduces the total amount of processing resources available to the block-storage application. For example, if there are ten cores available on the processing device 108-i, and one of the cores is executing a dedicated peek-poller thread, only nine of the cores or 90% of the processing resources of the processing device are available for use by the block-storage application.

U.S. patent application Ser. No. 16/251,868, filed Jan. 18, 2019 and entitled "Multi-Core Processor in Storage System Executing Dynamic Thread for Increased Core Availability," also incorporated by reference herein in its entirety, discloses in illustrative embodiments dynamic truck threads that may be executed on the cores of a processing device. The function of each of the dynamic truck threads is modifiable between multiple operating modes such that the full processing resources of all of the cores of a processing device are available for use by a block-storage application during periods of time when the block-storage application is exhibiting high levels of core utilization while the processing resources of the cores are also available for other applications during periods of time when the block-storage application is exhibiting moderate to low levels of core utilization.

For example, in such embodiments, the function of a given dynamic truck thread is dynamically modifiable between an operating mode where the given dynamic truck thread performs the above-described truck thread functionality and an operating mode where the given dynamic truck thread performs at least some of the above-described peek-poller thread functionality. In some embodiments, the functionality of each of the dynamic truck threads may also be modified to an operating mode where all functions of the dynamic truck threads are disabled on the cores 210 of the processing device 108-$i$ such that the processing resources of the cores 210 are fully available for use by other applications, such as a file-storage application.

Illustrative embodiments disclosed herein can utilize one or more of the techniques disclosed in the above-cited U.S. patent application Ser. Nos. 16/251,779 and 16/251,868. For example, one or more of the truck threads 224 of FIG. 2 may be implemented as respective dynamic truck threads. However, it is to be appreciated that utilization of such techniques is not required in illustrative embodiments disclosed herein.

The processing cores 210 of the FIG. 2 embodiment can therefore execute threads of multiple applications, including truck threads 224 and other application threads 226. For example, in some embodiments, a block-storage application is implemented by executing truck threads 224 on respective ones of the cores 210, with each of the truck threads 224 implementing a corresponding portion of the block-storage application. As described above, by executing truck threads 224 on respective cores 210, a significant portion of the processing resources of each of the cores 210 is utilized for polling interfaces associated with its corresponding truck thread, and processing associated tasks, events or other data found on those interfaces, leaving little to no processing resources available on that core for executing the threads of other applications. Some embodiments address this issue through the use of dynamic truck threads executing on one or more of the processing cores 210.

Performance monitoring techniques are illustratively used in storage system 105 to monitor the performance of core threads, such as the truck threads 224 executing on respective ones of the processing cores 210.

In some embodiments, the processing device 108-$i$ of the storage system 105 is configured to implement performance monitoring functionality for core threads of the storage system 105, such as the truck threads 224 that include respective schedulers 230. One or more of the schedulers 230 can each include both an internal scheduler and an external scheduler, as disclosed in U.S. patent application Ser. No. 16/747,138, filed Jan. 20, 2020 and entitled "Performance Monitoring for Storage System with Core Thread Comprising Internal and External Schedulers," which is incorporated by reference herein in its entirety.

The performance monitor 218 is configured to monitor performance of threads executing on the processing cores 210, such as truck threads 224 and other application threads 226. Such performance monitoring in illustrative embodiments involves collecting performance measurements from respective ones of the core threads.

For example, in the FIG. 2 embodiment, the truck thread 224-1 is assumed to be part of a block-storage application executing on the processing core 210-1. The truck thread 224-1 comprises a scheduler 230-1, which as noted above may include an internal scheduler, illustratively configured to control switching between particular ones of the X-threads 225-1 of the truck thread 224-1, and an external scheduler, illustratively configured to control release of the processing core 210-1 by the truck thread 224-1 for use by at least one of the other application threads 226-1 of a second application different than the block-storage application. In some embodiments, the second application comprises a file-storage application, although references herein to block-storage applications and file-storage applications are considered non-limiting examples.

The performance monitor 218 illustratively gathers such performance measurements from the truck thread 224-1 and from other ones of the truck threads 224 executing on respective other ones of the cores 210, and provides such measurements to the system manager 216 for use in controlling configuration of the processing device 108-$i$ and its processing cores 210 and their associated threads 224 and 226. As mentioned previously, the truck thread 224-1 when executing on the processing core 210-1 is illustratively configured to utilize substantially all available processing resources of the processing core 210-1, such as 90% or more of the available processing resources of that core. Other embodiments can combine at least portions of system manager 216 and performance monitor 218 into a single component implemented on one or more processing cores 210 of at least one of the processing devices 108.

As indicated above, the truck threads 224 run respective sets of X-threads 225. The X-threads 225 illustratively comprise respective lightweight threads that are scheduled by the schedulers 230 of the respective truck threads 224. For example, there may be thousands of X-threads 225 associated with each of the truck threads 224, with each of the X-threads 225 representing a specific flow or processing job (e.g., synchronous read/write, destage, RAID rebuild, defragmentation, and numerous others). The X-threads 225 in some embodiments are non-preemptive (e.g., cooperative), which means that one of the X-threads of a particular truck thread voluntarily gives up execution in order to allow another one of the X-threads of that truck thread to be scheduled. If an X-thread is doing a lengthy computational task (e.g., a task taking tens of microseconds), it should contain explicit yield and/or suspension calls, or implicit calls by waiting on synchronization objects.

It is assumed in some embodiments herein that each X-thread can be in one of multiple designated states at a particular point in time, including, for example, a running state, a ready state and a suspended state. In the running state, the X-thread is currently running. In the suspended state, the X-thread is waiting on a synchronization object (e.g., a semaphore, a timer, a lock, a barrier, a memory pool, a thread pool, etc.) In the ready state, the X-thread is ready to run, but waiting for the processing core (e.g., another X-thread is currently running).

The X-threads 225-1 are examples of what are more generally referred to herein as "sub-threads" of their corresponding truck thread 224-1. Other types of sub-threads having different arrangements of possible states can be used in other embodiments.

The X-threads 225-1 in some embodiments therefore comprise respective non-preemptive threads and the truck thread 224-1 is configured such that no X-thread in the running state is suspended to allow release of the processing core 210-1 by the truck thread 224-1 for use by the other application thread 226-1. Multiple suspensions of the truck thread 224-1 to allow the other application thread 226-1 to execute may therefore each occur in conjunction with a switch between X-threads 225-1 of the truck thread 224-1. As mentioned previously, the scheduling of the X-threads 225-1 is illustratively performed under the control of an internal scheduler in scheduler 230-1 of the truck thread 224-1.

In some embodiments, an external scheduler in scheduler 230 of the truck thread 224-1 comprises a processing core release component and a waker component. The processing core release component is configured to determine, in conjunction with each switch between X-threads 225-1 of the truck thread 224-1, whether or not the truck thread 224-1 will suspend itself so as to release the processing core 210-1 for use by at least another application thread 226-1 of the file-storage application. The processing core release component in some embodiments may be referred to as a CPU release component, as the processing cores such as cores 210 may comprise respective distinct CPUs of the processing device 108-1.

In some embodiments, the processing core release component of the truck thread 224-1 more particularly operates as follows. On every X-thread switch, a determination is made as to whether or not the truck thread 224-1 will give up execution, to allow other applications (e.g., a file-storage application) to run. When a truck thread suspends itself, it will resume execution when no other application is ready to run, or it will be rescheduled to run after a certain time by the waker component, whichever happens first.

The waker component is configured to determine, in conjunction with each switch between X-threads 225-1 of the truck thread 224-1, whether or not there is at least one additional thread of the block-storage application to be returned from suspension prior to release of the processing core 210-1 by the truck thread 224-1.

The waker component in some embodiments more particularly operates as follows. On every X-thread switch, and before the decision is made whether to give up the processing core, the waker component checks if there are currently one or more other truck threads of the block-storage application that are suspended and need to be awakened, and if so it wakes up the one or more other truck threads.

The processing core release component therefore illustratively operates in conjunction with the waker component to suspend the truck thread 224-1 and to return the truck thread 224-1 from suspension. Other arrangements of additional or alternative components can be included in the external scheduler of scheduler 230-1 in other embodiments.

Each of the other processing devices 108 is assumed to be similarly configured to processing device 108-1 as described above and elsewhere herein.

Performance monitoring functionality implemented in storage system 105 in some embodiments includes aspects of performance monitoring as disclosed in U.S. Pat. No. 10,152,232, entitled "Low-Impact Application-Level Performance Monitoring with Minimal and Automatically Upgradable Instrumentation in a Storage System," which is incorporated by reference herein in its entirety.

For example, U.S. Pat. No. 10,152,232 describes techniques for monitoring of storage system processing time dynamics at a flow level, in order to generate performance measurements that can be used for various purposes such as for the investigation and debugging of issues as well as for performance analysis of the storage system.

However, other performance monitoring techniques can be implemented in other embodiments, and illustrative embodiments should therefore not be viewed as being limited to use with any particular performance monitoring techniques, such as those disclosed in U.S. Pat. No. 10,152,232.

The manner in which a processing device 108-1 provides end-to-end QoS mechanisms using prioritized thread queues will now be described in more detail. Again, each of the other processing devices 108 is assumed to be configured in a manner similar to that described herein with regard to processing device 108-1. It is to be appreciated that in some embodiments, different end-to-end QoS mechanisms are provided for each of a plurality of IO operations processed by the storage system 105. The term "end-to-end" in this context illustratively refers to processing of a given IO operation from receipt of that IO operation in the storage system 105 from a given one of the host devices 102 to completion of the processing of that IO operation in the storage system 105. Other types and arrangements of end-to-end QoS mechanisms can be provided in other embodiments.

The processing device 108-1 is illustratively configured to associate different classes of service with respective threads of one or more applications executing on one or at least one of the processing cores 210, to configure different sets of prioritized thread queues 232 for respective ones of the different classes of service, to enqueue particular ones of the threads associated with particular ones of the classes of service in corresponding ones of the prioritized thread queues 232, and to implement different dequeuing policies for selecting particular ones of the enqueued threads from the different sets of prioritized thread queues 232 based at least in part on the different classes of service.

In some embodiments, the threads of the one or more applications executing on at least one of the processing cores 210 comprise different X-threads 225 of one or more truck threads 224 of one or more applications executing on a particular one of the processing cores 210, such as processing core 210-1. For example, the one or more applications can comprise a block-storage application of the storage system 105 and the one truck threads can comprise truck thread 224-1 that when executing on the processing core 210-1 is configured to utilize substantially all available processing resources of that processing core.

As indicated previously, each of the X-threads 225-1 of the truck thread 224-1 is illustratively in one of multiple designated states at a particular point in time, including a running state, a ready state and a suspended state. Other types and arrangements of states can be used in other embodiments.

Different ones of the X-threads 225-1 that are in the suspended state are illustratively enqueued in respective different ones of the prioritized thread queues 232-1 in order to wait for access to respective corresponding synchronization objects associated with resources of the processing core 210-1. A given such synchronization object can include, for example, a semaphore, a timer, a lock, a barrier, a memory pool and a thread pool, or various combinations thereof.

In some embodiments, associating different classes of service with respective threads of one or more applications comprises assigning designated class tags as attributes of the respective threads, with different ones of the class tags denoting respective different ones of the classes of service.

In operation, the storage system 105 illustratively receives an IO operation for processing, from one of the host devices 102, assigns a particular one of the class tags to the IO operation, and assigns the particular one of the class tags to each of a plurality of threads that are generated in conjunction with the processing of the IO operation. The assignment of the particular one of the class tags to the IO operation is persistent throughout the processing of the IO operation by the storage system 105. Such an arrangement is an example of what is more generally referred to herein as "end-to-end" processing of an IO operation within the storage system 105, and facilitates provision of a particular level of QoS for that IO operation in accordance with what is referred to herein as an "end-to-end QoS mechanism." Other types of QoS mechanisms can be implemented in other embodiments.

As indicated elsewhere herein, the processing of the IO operation is illustratively distributed across a plurality of distinct storage nodes 106 of the storage system 105, with each of the storage nodes 106 including a different one of the processing devices 108 and a corresponding set of processing cores 210 of the storage system 105. In such an arrangement, the assigned class tag for the IO operation is illustratively passed from a first one of the storage nodes 106 to a second one of the storage nodes 106 in conjunction with the processing of the IO operation and is assigned to one or more threads generated in the second storage node 106 for the processing of the IO operation. In this manner, the class tag assigned to the IO operation can remain persistent for the IO operation and its associated threads, throughout all processing of the IO operation in the storage system 105, even if such processing involves generation of different threads on different ones of the storage nodes 106.

The processing of the IO operation in the storage system 105 can be a very complex process that goes through many steps in multiple ones of storage nodes 106, with each such storage node running many different jobs involving different flows and components, with potentially large numbers of cross-dependencies. The disclosed techniques advantageously facilitate the provision of QoS guarantees for particular IO operations in these and numerous other storage system contexts, as will be described in more detail below. Such QoS guarantees can be provided for the IO operations of particular applications, users, storage volumes or other system entities, in any combination.

In illustrative embodiments, end-to-end QoS mechanisms are provided using the prioritized thread queues 232-1, in conjunction with the above-described class tag assignment functionality. Such embodiments are highly stable and adaptive to different IO patterns and other conditions.

For example, in some embodiments, the different sets of prioritized thread queues 232-1 configured for respective ones of the different classes of service illustratively provide different dynamically adjustable latency levels for the threads that are enqueued therein.

More particularly, some embodiments provide uniform sets of prioritized thread queues 232-1 for respective ones of a plurality of different synchronization objects. For example, a single non-prioritized thread queue of a given one of the synchronization objects is illustratively replaced with multiple thread queues and priority-based selection among the multiple thread queues for the given synchronization object.

In some embodiments, configuring different sets of prioritized thread queues 232-1 for respective ones of the different classes of service comprises determining a number of priority classes, determining a number of selection indexes for respective ones of the priority classes, and establishing a particular number of prioritized thread queues based at least in part on the number of priority classes and the number of selection indexes. For example, the selection indexes can be round robin selection indexes, as illustrated in the example to be described below in conjunction with the embodiment of FIG. 4.

Configuring different sets of prioritized thread queues 232-1 for respective ones of the different classes of service in some embodiments comprises determining a number of priority classes, establishing a set of prioritized thread queues for each of the priority classes, and assigning weights to respective ones of the sets of prioritized thread queues 232-1 of the respective priority classes. The prioritized thread queues within a given one of the sets of prioritized thread queues 232-1 each have a same priority for selection of threads enqueued therein, and different ones of the prioritized thread queues in different ones of the sets have different priorities for selection of threads enqueued therein.

As indicated previously, a given one of the X-threads 225-1 can be in different states at different times, including, for example, a running state, a suspended state and a ready state. When in the suspended state, the X-thread is illustratively queued in one of the prioritized thread queues 232-1. When in the ready state, the X-thread is illustratively queued in a ready queue of the scheduler 230-1.

In some embodiments, a given end-to-end QoS mechanism using prioritized thread queues 232-1 is illustratively configured to control latency of a corresponding IO operation in a manner that achieves a particular desired QoS level, primarily by controlling waiting time of its corresponding X-threads 225-1. It should be noted in this regard that a reduction in latency to allow some IO operations to achieve a relatively high QoS level necessarily involves an increase in latency for other IO operations.

The processing of a given IO operation is illustratively comprised of intervals of X-thread processing time and waiting time. The latter illustratively includes time spent in thread queues waiting for the above-noted synchronization objects, and/or RPC replies, disk acknowledgements, resource allocations, and so on.

Figure 4:
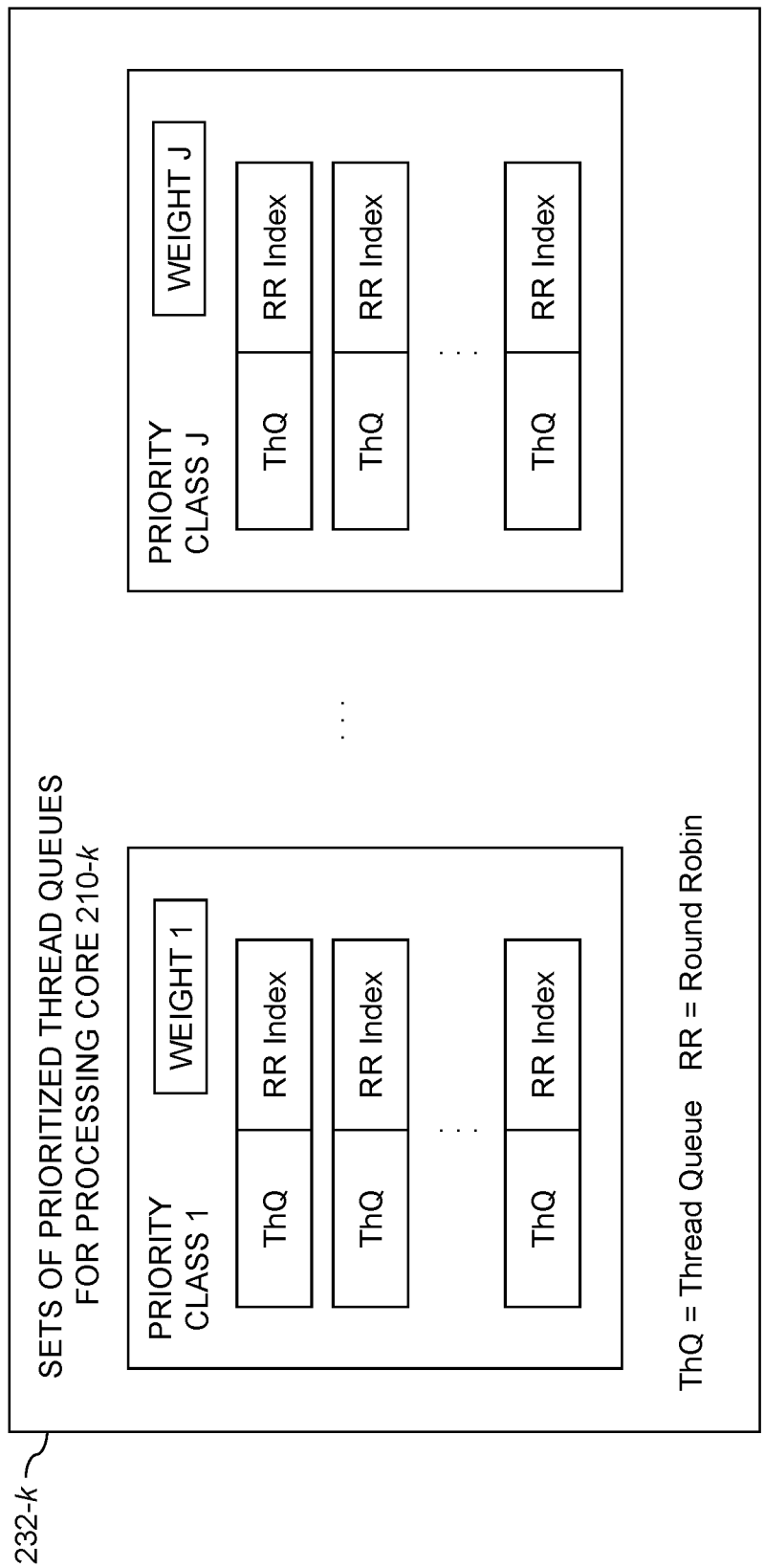
FIG. 4 shows an example of a set of prioritized thread queues within a given processing core in an illustrative embodiment.

A given set of prioritized thread queues 232-1 is configured for a corresponding class of service in order to manage this waiting time so as to achieve the desired QoS objective. Such a set of prioritized thread queues illustratively comprises multiple thread queues for a given priority class, with each thread queue having a selection index, and each priority class having a specified weight. A more particular example of such an arrangement is illustrated in FIG. 4 and described in more detail below.

Synchronization objects that might otherwise have only a single thread queue associated therewith can thereby instead be associated with a set of multiple such thread queues with appropriate prioritization control as disclosed herein. A given such set of multiple thread queues is an example of what is more generally referred to herein as a "set of prioritized thread queues." The multiple thread queues may also be collectively referred to herein as comprising a "prioritized thread queue." The term "prioritized thread queue" as used herein is therefore intended to be broadly construed.

Illustrative embodiments allow the above-noted single thread queue of a given synchronization object to be replaced with a prioritized thread queue of the type disclosed herein. This allows different prioritization policies to be provided for different threads that are waiting for this synchronization object, instead of the single thread queue arrangement without any prioritization.

Prioritized thread queues are illustratively used for all or substantially all synchronization objects for which threads encounter significant waiting times, and such determinations as to whether or not to utilize prioritized thread queues for certain synchronization objects can be made during development and/or testing of the storage system 105. For those synchronization objects that do not involve significant waiting times for their corresponding enqueued threads, prioritized thread queues need not be used.

In some embodiments, an example implementation of a prioritized thread queue ("PrioThQ") operates in the following manner.

Each IO operation that enters the storage system 105 is classified according to its attributes (e.g., application, user, storage volume, etc.) and is assigned an appropriate class of service (CoS) tag based on the classification. If a particular IO operation cannot be classified, it may be assigned a default CoS tag. Such CoS tags are examples of what are more generally referred to herein as "class tags."

The assigned CoS tag is persistent for a given IO operation throughout its processing lifetime in the storage system 105. The assigned CoS tag is illustratively maintained as an X-thread attribute for any X-threads utilized in processing the IO operation.

As the processing of a given IO operation may involve multiple storage nodes 106, the assigned CoS tag is illustratively passed across the storage system 105 from a source storage node to a destination storage node as an RPC attribute and is used to tag a handling X-thread at the destination node. Multiple instances of such passing of the CoS tag between storage nodes may occur in processing the given IO operation. All X-threads utilized in processing the given IO operation will therefore have the same assigned CoS tag.

The PrioThQ in this example implementation provides flexible and distinct dequeuing policies for X-threads of a given IO operation based on the assigned CoS tags. For example, each of a plurality of different synchronization objects may have respective different PrioThQs associated therewith.

In some embodiments, the PrioThQ is a generalization of a basic ThQ class, where ThQ denotes a single thread queue, illustratively a simple first-in first-out (FIFO) queue. The PrioThQ provides a generic basis for different prioritized synchronization objects, such as semaphores, timers, locks, barriers, memory pools, thread pools etc. The PrioThQ may be viewed as aggregation of several simple ThQs with a smart dequeuing policy for dequeuing threads from those multiple ThQs.

The number of ThQs in a given PrioThQ is illustratively defined on PrioThQ creation. For example, this number may be defined by two parameters, namely, the number of priority classes and the number of round robin indexes. More particularly, the number of ThQs is illustratively equal to the product of the number of priority classes and the number of round robin indexes. Other techniques can be used to determine the number of ThQs within the given PrioThQ in other embodiments.

The priority class illustratively defines the priority or weight of the corresponding ThQ. The priority or weight of each ThQ is set during PrioThQ creation and may be changed at any time thereafter. The weights assigned to the different priority classes are illustratively defined in percentages or other measures. In the case of percentages, the sum of all priority class weights is 100%. For example, a priority class having an assigned weight of 20% means that 20 dequeue events out of every 100 dequeue events are guaranteed or reserved to the corresponding ThQs of that priority class. If all ThQs of this priority class are empty, an available scheduling slot will be passed to the next priority class.

An "out of order" priority class may be configured in some embodiments, with no other ThQs being served if any such "out of order" ThQ is not empty.

In some embodiments, all ThQs in the same priority class have the same priority. When it is the turn of a particular priority class to be scheduled, based on the weights assigned to the various priority classes, a specific ThQ inside the particular priority class is selected in accordance with a round robin policy using the round robin indexes, and a thread is dequeued from the specific selected ThQ.

This combination of priority class and round robin index in illustrative embodiments permits implementation of a wide variety of different dequeuing policies in a highly flexible manner.

Example processes implemented in the storage system 105 to support creation, configuration and utilization of the above-described PrioThQ illustratively include one or more of the following:

PrioThQ_create(n_PriorityClass, n_RoundRobinIndex)
PrioThQ_set_priorities(Array_of_weights_in_percent_for_each_PriorityClass)
PrioThQ_queue_xthread(X-thread, PriorityClass, RoundRobinIndex)
PrioThQ_dequeue_xthread( )—this process implements the PrioThQ dequeuing policy by dequeuing and returning an X-thread from a selected ThQ that is chosen based on current priority class scheduling turn and round robin selection.

It is to be appreciated that the PrioThQ features and functionality as described above are presented by way of illustrative example only, and are not limiting in any way. Other prioritized thread queue arrangements can be used in other embodiments.

The above-described example prioritized thread queue arrangements advantageously provide a uniform, flexible and extensible framework for prioritization and control. As indicated previously, such arrangements are highly stable and adaptive to different IO patterns and other conditions.

It is assumed that the other prioritized thread queues 232 are similarly utilized to support provision of particular levels of QoS in each of the other processing devices 108 of the storage system 105.

In some embodiments, each of the processing devices 108 incudes its own system manager 216 and performance monitor 218. However, in other embodiments, it is possible that such components are implemented on only one of the processing devices 108, or on other subsets of the processing devices 108, in which case a system manager 216 and performance monitor 218 implemented on one of the processing devices 108 may provide similar system management and performance monitoring functionality for one or more other ones of the processing devices 108. It is therefore possible that one or more of the processing devices 108 may not include its own instances of system manager 216 and/or performance monitor 218. Also, although system manager 216 and performance monitor 218 are illustratively shown as executing on a separate core 210-0 in this embodiment, this is by way of example only, and in other embodiments, one or more of these components may each be distributed over multiple ones of the cores 210.

In some embodiments, storage system 105 may comprise a separate processing device that executes the system manager 216 and manages the truck threads 224 executing on the cores 210 of the processing devices 108 of the nodes 106.

Accordingly, in some embodiments, the execution and implementation of system manager 216 and/or performance monitor 218 may be distributed across multiple cores 210, processing devices 108, and/or nodes 106.

In some embodiments, the system manager 216 and performance monitor 218 collectively monitor the core utilization of one or more of the processing devices 108 and may dynamically control and change the modes in which the truck threads 224 and other application threads 226 operate in order to adapt the storage system 105 to actual usage patterns of the users associated with the host devices 102.

These and other embodiments can utilize various techniques for disabling and re-enabling threads, including those disclosed in U.S. patent application Ser. No. 16/162,471, filed Oct. 17, 2018 and entitled "Dynamic Multitasking for Distributed Storage Systems," which is incorporated by reference herein in its entirety.

The operation of the information processing system 100 will now be described in further detail with reference to the flow diagram of the illustrative embodiment of FIG. 3. The process as shown in FIG. 3 includes steps 300 through 306, and is suitable for use in system 100 but is more generally applicable to other types of information processing systems in which a storage system is configured to implement an end-to-end QoS mechanism using prioritized thread queues of the type disclosed herein.

Figure 3:
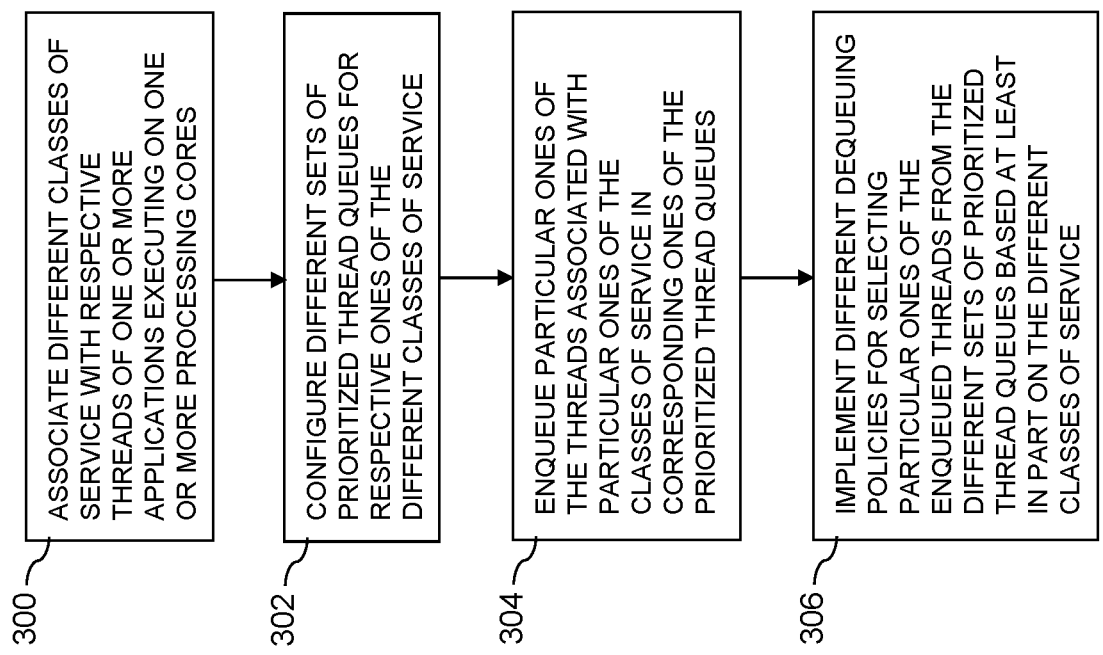
FIG. 3 is a flow diagram of an example process providing an end-to-end QoS mechanism using prioritized thread queues in an illustrative embodiment.

The steps of FIG. 3 are illustratively performed at least in part under the control of one or more processing devices 108 of one or more nodes 106 in storage system 105 of system 100. For example, in some embodiments, the steps of FIG. 3 may be performed under the control of system manager 216 executing on processing device 108-$i$ of a corresponding one of the nodes 106 of the storage system 105. Some or all of the steps may be performed asynchronously relative to one another rather than serially as illustrated in the figures. Also, multiple instances of the process can be performed at least in part in parallel to one another for different truck threads or other block-storage threads of different processing cores of processing device 108-$i$. It is further assumed that each of the other processing devices 108 executes similar processes for implementing prioritized thread queues for truck threads 224 and possibly other application threads 226 of their respective processing cores 210.

In step 300, different classes of service are associated with respective threads of one or more applications executing on at least one of a plurality of processing cores of a storage system. For example, a particular class tag is illustratively assigned to a given IO operation received from an application on a host device, and that same class tag is associated with each of the threads utilized in conjunction with processing of that IO operation.

In step 302, different sets of prioritized thread queues are configured for respective ones of the different classes of service. For example, multiple sets of prioritized thread queues 232-$i$ can be implemented for enqueuing different ones of the X-threads 225-$i$ of a truck thread 224-$i$ executing on an i-th processing core 210-$i$ in order to provide end-to-end QoS mechanisms for different IO operations being processed by the storage system 105. Other types and arrangements of prioritized thread queues can be used in other embodiments. Each of the processing cores 210 can be configured in a similar manner with respect to its prioritized thread queues 232. Alternatively, different configurations of the prioritized thread queues 232 can be used in different ones of the processing cores 210.

In step 304, particular ones of the threads associated with particular ones of the classes of service are enqueued in corresponding ones of the prioritized thread queues.

In step 306, different dequeuing policies are implemented for selecting particular ones of the enqueued threads from the different sets of prioritized thread queues based at least in part on the different classes of service.

Functionality such as that described in conjunction with the flow diagram of FIG. 3 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, a storage controller comprising at least a portion of each of one or more of the processing devices 108 of storage system 105 and configured to control performance of one or more steps of the process of FIG. 3 in system 100 can be implemented as part of what is more generally referred to herein as a processing platform comprising one or more processing devices each comprising a processor coupled to a memory. A given such storage controller may correspond to one or more virtual machines or other types of virtualization infrastructure such as Docker containers or Linux containers (LXCs). The storage controller, as well as other system components, may be implemented at least in part using processing devices of such processing platforms. For example, in a distributed implementation, respective distributed modules of such a storage system 105 can be implemented in respective containers running on respective ones of the processing devices of a processing platform.

FIG. 4 shows example sets of prioritized thread queues 232-$k$ for processing core 210-$k$, where k=1, 2, . . . P. Similar sets of prioritized thread queues 232 can be implemented for each of the processing cores 210. In this embodiment, the sets of prioritized thread queues 232-$k$ for processing core 210-$k$ comprise different sets of prioritized thread queues for respective ones of a plurality of different classes denoted Priority Class 1, . . . Priority Class J, where J is an arbitrary integer greater than or equal to two.

Within a given priority class, such as Priority Class 1, there are multiple thread queues, each denoted ThQ and having a corresponding round robin (RR) index as shown. Each of the multiple thread queues is illustratively configured as a particular type of queue, such as a FIFO queue.

There is also a weight assigned to each of the priority classes, with the weights being denoted as Weight 1, . . . Weight J, for respective priority classes Priority Class 1, . . . Priority Class J. The weights establish the relative priorities between the priority classes, and may be implemented, for example, as respective percentages that total to 100%. The RR indexes are utilized to support RR selection from among the ThQs within a given priority class. With the assigned weights controlling relative priorities among the priority classes and the RR indexes being used for RR selection within each class, end-to-end QoS mechanisms are provided for respective IO operations processed in the storage system 105.

It is to be appreciated that the particular features of FIG. 4, and those of other illustrative embodiments, are presented by way of example only, and should not be construed as limiting in any way.

In some embodiments, a storage system comprises a distributed content addressable storage (CAS) system configured to support end-to-end QoS mechanisms using prioritized thread queues as disclosed herein. A distributed CAS system is also referred to herein as a clustered CAS system. A "distributed CAS system" as that term is broadly used herein includes any CAS system that is distributed across multiple storage nodes, such as the nodes 106 of storage system 105.

An illustrative embodiment of such a CAS system will now be described with reference to FIG. 5. In this embodiment, a CAS system 505 comprises a plurality of storage devices 506 and an associated storage controller 508. The CAS system 505 may be viewed as a particular implementation of the storage system 105, and accordingly is assumed to be coupled to host devices 102 via network 104 in system 100.

The storage controller 508 in the present embodiment is configured to support prioritized thread queues of the type previously described in conjunction with FIGS. 1 through 4. For example, the CAS system 505 illustratively interacts with one or more host devices 102 to support performance of a process such as that shown in FIG. 3, in order to provide sets of prioritized thread queues of the type shown in FIG. 4 for core threads executing on processing cores of the storage controller 508 in the CAS system 505.

The storage controller 508 includes distributed modules 516 and 518, which are configured to operate in a manner similar to that described above for respective system manager 216 and performance monitor 218 of the processing device 108-i of system 100. Module 516 is more particularly referred to as distributed system management logic, and illustratively comprises multiple system management logic instances on respective ones of a plurality of distinct nodes, with the multiple system management logic instances collectively supporting end-to-end QoS mechanisms as disclosed herein. Module 518 more particularly comprises distributed performance monitoring logic with different instances thereof also being implemented on respective ones of the distinct nodes.

Figure 5:
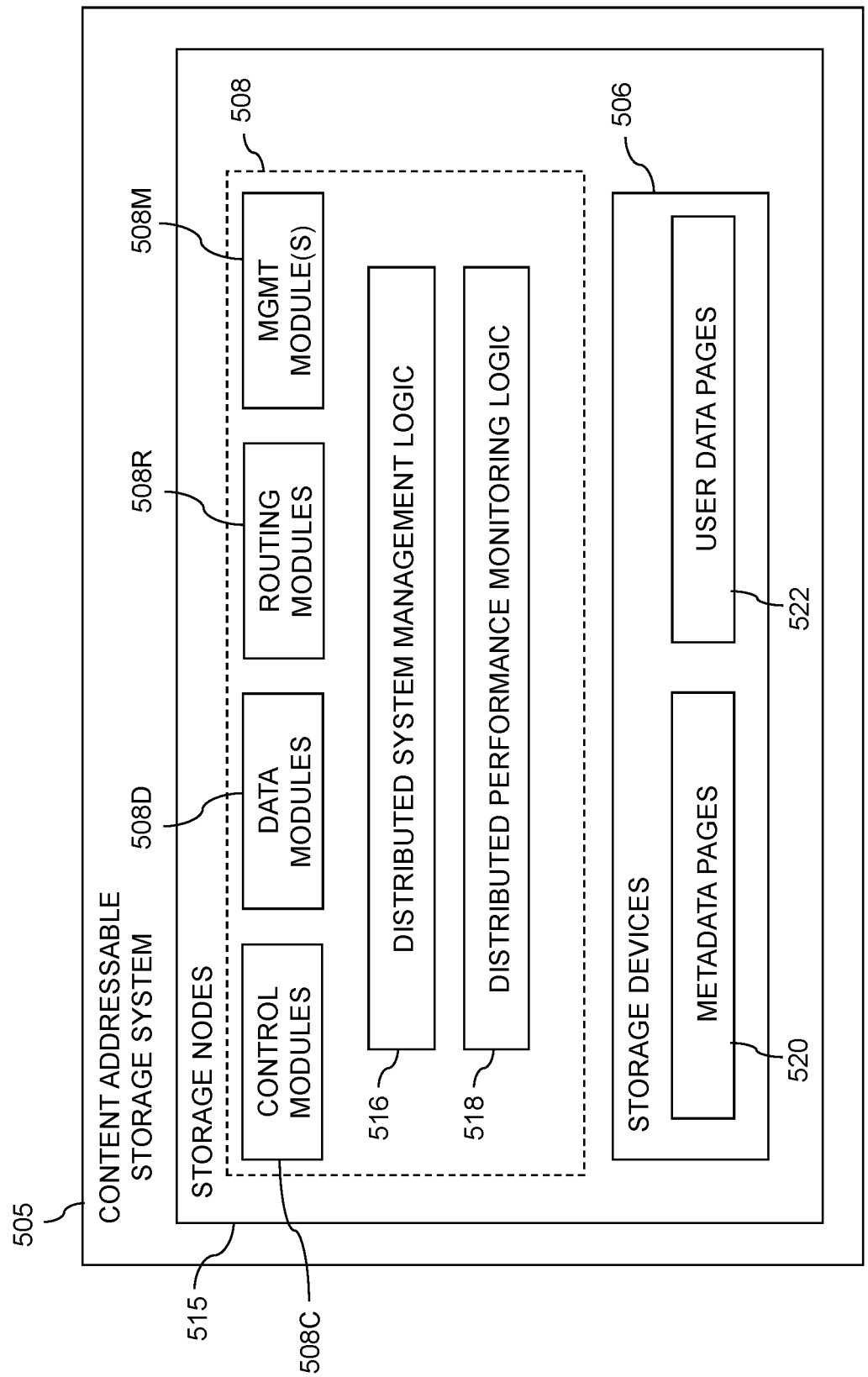
FIG. 5 shows a content addressable storage system having a distributed storage controller configured for implementing an end-to-end QoS mechanism using prioritized thread queues in an illustrative embodiment.

The CAS system 505 in the FIG. 5 embodiment is implemented as a distributed storage system and illustratively includes a plurality of storage nodes 515 each comprising a corresponding subset of the storage devices 506. Such storage nodes 515 are examples of the "distinct nodes" referred to above, and other distributed or clustered storage system arrangements comprising multiple storage nodes and possibly additional or alternative nodes can be used in other embodiments. A given distributed or clustered storage system may therefore include not only storage nodes 515 but also additional storage nodes, compute nodes or other types of nodes coupled to network 104. Alternatively, such additional storage nodes may be part of another distributed or clustered storage system of the system 100. Each of the storage nodes 515 of the CAS system 505 is assumed to be implemented using at least one processing device comprising a processor coupled to a memory.

The storage controller 508 of the CAS system 505 is implemented in a distributed manner so as to comprise a plurality of distributed storage controller components implemented on respective ones of the storage nodes 515. The storage controller 508 is therefore an example of what is more generally referred to herein as a "distributed storage controller." In subsequent description herein, the storage controller 508 is referred to as distributed storage controller 508.

Each of the storage nodes 515 in this embodiment further comprises a set of processing modules configured to communicate over one or more networks with corresponding sets of processing modules on other ones of the storage nodes 515. The sets of processing modules of the storage nodes 515 collectively comprise at least a portion of the distributed storage controller 508 of the CAS system 505.

The modules of the distributed storage controller 508 in the present embodiment more particularly comprise different sets of processing modules implemented on each of the storage nodes 515. The set of processing modules of each of the storage nodes 515 comprises at least a control module 508C, a data module 508D and a routing module 508R. The distributed storage controller 508 further comprises one or more management ("MGMT") modules 508M. For example, only a single one of the storage nodes 515 may include a management module 508M. It is also possible that management modules 508M may be implemented on each of at least a subset of the storage nodes 515. A given set of processing modules implemented on a particular one of the storage nodes 515 therefore illustratively includes at least one control module 508C, at least one data module 508D and at least one routing module 508R, and possibly a management module 508M.

Communication links may be established between the various processing modules of the distributed storage controller 508 using well-known communication protocols such as TCP/IP and RDMA. For example, respective sets of IP links used in data transfer and corresponding messaging could be associated with respective different ones of the routing modules 508R.

Although shown as separate modules of the distributed storage controller 508, the modules 516 and 518 in the present embodiment are assumed to be distributed at least in part over at least a subset of the other modules 508C, 508D, 508R and 508M of the storage controller 508. Accordingly, at least portions of the storage system functionality of the modules 516 and 518 may be implemented in one or more of the other modules of the storage controller 508. In other embodiments, the modules 516 and 518 may be implemented as stand-alone modules of the storage controller 508.

The storage devices 506 are configured to store metadata pages 520 and user data pages 522, and may also store additional information not explicitly shown such as checkpoints and write journals. The metadata pages 520 and the user data pages 522 are illustratively stored in respective designated metadata and user data areas of the storage devices 506. Accordingly, metadata pages 520 and user data pages 522 may be viewed as corresponding to respective designated metadata and user data areas of the storage devices 506.

A given "page" as the term is broadly used herein should not be viewed as being limited to any particular range of fixed sizes. In some embodiments, a page size of 8 kilobytes (KB) is used, but this is by way of example only and can be varied in other embodiments. For example, page sizes of 4 KB, 16 KB or other values can be used. Accordingly, illustrative embodiments can utilize any of a wide variety of alternative paging arrangements for organizing the metadata pages 520 and the user data pages 522.

The user data pages 522 are part of a plurality of LUNs configured to store files, blocks, objects or other arrangements of data, each also generally referred to herein as a "data item," on behalf of users of the CAS system 505. Each such LUN may comprise particular ones of the above-noted pages of the user data area. The user data stored in the user data pages 522 can include any type of user data that may be utilized in the system 100. The term "user data" herein is therefore also intended to be broadly construed.

A given storage volume for which content-based signatures are generated in the CAS system 505 illustratively comprises a set of one or more LUNs, each including multiple ones of the user data pages 522 stored in storage devices 506.

The CAS system 505 in the embodiment of FIG. 5 is configured to generate hash metadata providing a mapping between content-based digests of respective ones of the user data pages 522 and corresponding physical locations of those pages in the user data area. Content-based digests generated using hash functions are also referred to herein as "hash digests." Such hash digests or other types of content-based digests are examples of what are more generally referred to herein as "content-based signatures" of the respective user data pages 522. The hash metadata generated by the CAS system 505 is illustratively stored as metadata pages 520 in the metadata area. The generation and storage of the hash metadata is assumed to be performed under the control of the storage controller 508.

Each of the metadata pages 520 characterizes a plurality of the user data pages 522. For example, in a given set of n user data pages representing a portion of the user data pages 522, each of the user data pages is characterized by a LUN identifier, an offset and a content-based signature. The content-based signature is generated as a hash function of content of the corresponding user data page. Illustrative hash functions that may be used to generate the content-based signature include the well-known SHA1 secure hashing algorithm, or other secure hashing algorithms known to those skilled in the art, including SHA2, SHA256 and many others. The content-based signature is utilized to determine the location of the corresponding user data page within the user data area of the storage devices 506.

Each of the metadata pages 520 in the present embodiment is assumed to have a signature that is not content-based. For example, the metadata page signatures may be generated using hash functions or other signature generation algorithms that do not utilize content of the metadata pages as input to the signature generation algorithm. Also, each of the metadata pages is assumed to characterize a different set of the user data pages.

A given set of metadata pages representing a portion of the metadata pages 520 in an illustrative embodiment comprises metadata pages having respective signatures. Each such metadata page characterizes a different set of n user data pages. For example, the characterizing information in each metadata page can include the LUN identifiers, offsets and content-based signatures for each of the n user data pages that are characterized by that metadata page. It is to be appreciated, however, that the user data and metadata page configurations described above are examples only, and numerous alternative user data and metadata page configurations can be used in other embodiments.

Ownership of a user data logical address space within the CAS system 505 is illustratively distributed among the control modules 508C.

The storage system functionality provided at least in part by modules 516 and 518 in this embodiment is assumed to be distributed across multiple distributed processing modules, including at least a subset of the processing modules 508C, 508D, 508R and 508M of the distributed storage controller 508.

For example, the management module 508M of the storage controller 508 may include a system management logic instance that engages corresponding system management logic instances in all of the control modules 508C and routing modules 508R in order to support end-to-end QoS mechanisms using prioritized thread queues, as well as other related storage system functionality, within the CAS system 505.

In some embodiments, each user data page has a fixed size such as 8 KB and its content-based signature is a 20-byte signature generated using the SHA1 secure hashing algorithm. Also, each page has a LUN identifier and an offset, and so is characterized by <lun_id, offset, signature>.

The content-based signature in the present example comprises a content-based digest of the corresponding data page. Such a content-based digest is more particularly referred to as a "hash digest" of the corresponding data page, as the content-based signature is illustratively generated by applying a hash function such as the SHA1 secure hashing algorithm to the content of that data page. The full hash digest of a given data page is given by the above-noted 20-byte signature. The hash digest may be represented by a corresponding "hash handle," which in some cases may comprise a particular portion of the hash digest. The hash handle illustratively maps on a one-to-one basis to the corresponding full hash digest within a designated cluster boundary or other specified storage resource boundary of a given storage system. In arrangements of this type, the hash handle provides a lightweight mechanism for uniquely identifying the corresponding full hash digest and its associated data page within the specified storage resource boundary. The hash digest and hash handle are both considered examples of "content-based signatures" as that term is broadly used herein.

Examples of techniques for generating and processing hash handles for respective hash digests of respective data pages are disclosed in U.S. Pat. No. 9,208,162, entitled "Generating a Short Hash Handle," and U.S. Pat. No. 9,286,003, entitled "Method and Apparatus for Creating a Short Hash Handle Highly Correlated with a Globally-Unique Hash Signature," each incorporated by reference herein in its entirety.

The distributed storage controller 508 in this example is configured to group consecutive pages into page groups, to arrange the page groups into slices, and to assign the slices to different ones of the control modules 508C. For example, if there are 1024 slices distributed evenly across the control modules 508C, and there are a total of 16 control modules in a given implementation, each of the control modules "owns" 1024/16=64 slices. In such arrangements, different ones of the slices are assigned to different ones of the control modules 508C such that control of the slices within the storage controller 508 of the CAS system 505 is substantially evenly distributed over the control modules 508C of the distributed storage controller 508.

The data modules 508D allow a user to locate a given user data page based on its signature. Each metadata page also has a size of 8 KB and includes multiple instances of the <lun_id, offset, signature> for respective ones of a plurality of the user data pages. Such metadata pages are illustratively generated by the control modules 508C but are accessed using the data modules 508D based on a metadata page signature.

The metadata page signature in this embodiment is a 20-byte signature but is not based on the content of the metadata page. Instead, the metadata page signature is generated based on an 8-byte metadata page identifier that is a function of the LUN identifier and offset information of that metadata page.

If a user wants to read a user data page having a particular LUN identifier and offset, the corresponding metadata page identifier is first determined, then the metadata page signature is computed for the identified metadata page, and then the metadata page is read using the computed signature. In this embodiment, the metadata page signature is more particularly computed using a signature generation algorithm that generates the signature to include a hash of the 8-byte metadata page identifier, one or more ASCII codes for particular predetermined characters, as well as possible additional fields. The last bit of the metadata page signature may always be set to a particular logic value so as to distinguish it from the user data page signature in which the last bit may always be set to the opposite logic value.

The metadata page signature is used to retrieve the metadata page via the data module. This metadata page will include the <lun_id, offset, signature> for the user data page if the user page exists. The signature of the user data page is then used to retrieve that user data page, also via the data module.

Write requests processed in the CAS system 505 each illustratively comprise one or more IO operations directing that at least one data item of the CAS system 505 be written to in a particular manner. A given write request is illustratively received in the CAS system 505 from a host device over a network. In some embodiments, a write request is received in the distributed storage controller 508 of the CAS system 505, and directed from one processing module to another processing module of the distributed storage controller 508. For example, a received write request may be directed from a routing module 508R of the distributed storage controller 508 to a particular control module 508C of the distributed storage controller 508. Other arrangements for receiving and processing write requests from one or more host devices can be used.

The term "write request" as used herein is intended to be broadly construed, so as to encompass one or more IO operations directing that at least one data item of a storage system be written to in a particular manner. A given write request is illustratively received in a storage system from a host device.

In some embodiments, the control modules 508C, data modules 508D and routing modules 508R of the storage nodes 515 communicate with one another over a high-speed internal network such as an InfiniBand network. The control modules 508C, data modules 508D and routing modules 508R coordinate with one another to accomplish various IO processing tasks.

The write requests from the host devices identify particular data pages to be written in the CAS system 505 by their corresponding logical addresses each comprising a LUN ID and an offset.

As noted above, a given one of the content-based signatures illustratively comprises a hash digest of the corresponding data page, with the hash digest being generated by applying a hash function to the content of that data page. The hash digest may be uniquely represented within a given storage resource boundary by a corresponding hash handle.

The processing modules of distributed storage controller 508 as disclosed herein utilize metadata structures that include logical layer and physical layer mapping tables to be described below. It is to be appreciated that these particular tables are only examples, and other tables or metadata structures having different configurations of entries and fields can be used in other embodiments. The logical layer and physical layer mapping tables in this embodiment illustratively include the following:

1. An address-to-hash ("A2H") table. The A2H table comprises a plurality of entries accessible utilizing logical addresses as respective keys, with each such entry of the A2H table comprising a corresponding one of the logical addresses, a corresponding one of the hash handles, and possibly one or more additional fields.
2. A hash-to-data ("H2D") table that illustratively comprises a plurality of entries accessible utilizing hash handles as respective keys, with each such entry of the H2D table comprising a corresponding one of the hash handles, a physical offset of a corresponding one of the data pages, and possibly one or more additional fields.
3. A hash metadata ("HMD") table illustratively comprising a plurality of entries accessible utilizing hash handles as respective keys. Each such entry of the HMD table comprises a corresponding one of the hash handles, a corresponding reference count and a corresponding physical offset of one of the data pages. A given one of the reference counts denotes the number of logical pages in the storage system that have the same content as the corresponding data page and therefore point to that same data page via their common hash digest. The HMD table illustratively comprises at least a portion of the same information that is found in the H2D table. Accordingly, in other embodiments, those two tables can be combined into a single table, illustratively referred to as an H2D table, an HMD table or another type of physical layer mapping table providing a mapping between hash values, such as hash handles or hash digests, and corresponding physical addresses of data pages.
4. A physical layer based ("PLB") table that illustratively comprises a plurality of entries accessible utilizing physical offsets as respective keys, with each such entry of the PLB table comprising a corresponding one of the physical offsets, a corresponding one of the hash digests, and possibly one or more additional fields.

As indicated above, the hash handles are generally shorter in length than the corresponding hash digests of the respective data pages, and each illustratively provides a short representation of the corresponding full hash digest. For example, in some embodiments, the full hash digests are 20 bytes in length, and their respective corresponding hash handles are illustratively only 4 or 6 bytes in length.

Again, the logical layer and physical layer mapping tables referred to above are examples only, and can be varied in other embodiments. For example, other types of hash-to-physical ("H2P") mapping tables may be used in addition to or in place of the above-noted HMD and PLB tables.

In some embodiments, certain ones of the above-described mapping tables are maintained by particular modules of distributed storage controller 508. For example, the mapping tables maintained by the control modules 508C illustratively comprise at least one A2H table and possibly also at least one H2D table. The A2H tables are utilized to store address-to-hash mapping information and the H2D tables are utilized to store hash-to-data mapping information, in support of mapping of logical addresses for respective pages to corresponding physical addresses for those pages via respective hashes or other types of content-based signatures, as described in further detail elsewhere herein.

The CAS system 505 utilizes a two-level mapping process to map logical block addresses to physical block addresses.

The first level of mapping uses an A2H table and the second level of mapping uses an HMD table, with the A2H and HMD tables corresponding to respective logical and physical layers of the content-based signature mapping within the CAS system 505. The HMD table or a given portion thereof in some embodiments disclosed herein is more particularly referred to as an H2D table, although it is to be understood that these and other mapping tables or other data structures referred to herein can be varied in other embodiments.

The first level of mapping using the A2H table associates logical addresses of respective data pages with respective content-based signatures of those data pages. This is also referred to as logical layer mapping.

The second level of mapping using the HMD table associates respective ones of the content-based signatures with respective physical storage locations in one or more of the storage devices 506. This is also referred to as physical layer mapping.

Examples of these and other metadata structures utilized in illustrative embodiments were described above. These particular examples illustratively include respective A2H, H2D, HMD and PLB tables. In some embodiments, the A2H and H2D tables are utilized primarily by the control modules 508C, while the HMD and PLB tables are utilized primarily by the data modules 508D.

For a given write request, hash metadata comprising at least a subset of the above-noted tables is updated in conjunction with the processing of that write request.

The A2H, H2D, HMD and PLB tables described above are examples of what are more generally referred to herein as "mapping tables" of respective distinct types. Other types and arrangements of mapping tables or other content-based signature mapping information may be used in other embodiments.

Such mapping tables are still more generally referred to herein as "metadata structures" of the CAS system 505. It should be noted that additional or alternative metadata structures can be used in other embodiments. References herein to particular tables of particular types, such as A2H, H2D, HMD and PLB tables, and their respective configurations, should be considered non-limiting and are presented by way of illustrative example only. Such metadata structures can be implemented in numerous alternative configurations with different arrangements of fields and entries in other embodiments.

The logical block addresses or LBAs of a logical layer of the CAS system 505 correspond to respective physical blocks of a physical layer of the CAS system 505. The user data pages of the logical layer are organized by LBA and have reference via respective content-based signatures to particular physical blocks of the physical layer.

Each of the physical blocks has an associated reference count that is maintained within the CAS system 505. The reference count for a given physical block indicates the number of logical blocks that point to that same physical block.

In releasing logical address space in the storage system, a dereferencing operation is generally executed for each of the LBAs being released. More particularly, the reference count of the corresponding physical block is decremented. A reference count of zero indicates that there are no longer any logical blocks that reference the corresponding physical block, and so that physical block can be released.

It should also be understood that the particular arrangement of storage controller processing modules 508C, 508D, 508R and 508M as shown in the FIG. 5 embodiment is presented by way of example only. Numerous alternative arrangements of processing modules of a distributed storage controller may be used to implement end-to-end QoS mechanisms using prioritized thread queues in a distributed storage system in other embodiments.

Additional examples of content addressable storage functionality implemented in some embodiments by control modules 508C, data modules 508D, routing modules 508R and management module(s) 508M of distributed storage controller 508 can be found in U.S. Pat. No. 9,104,326, entitled "Scalable Block Data Storage Using Content Addressing," which is incorporated by reference herein in its entirety. Alternative arrangements of these and other storage node processing modules of a distributed storage controller in a CAS system can be used in other embodiments.

Illustrative embodiments of a storage system with an end-to-end QoS mechanism using prioritized thread queues as disclosed herein can provide a number of significant advantages relative to conventional arrangements.

For example, illustrative embodiments disclosed herein are advantageously configured to facilitate provision of effective QoS guarantees for IO operations in a storage system in which one or more processing cores of the storage system are used to execute multiple threads of different applications.

Additionally or alternatively, some embodiments disclosed herein are advantageously configured to provide multiple distinct classes of service for respective different sub-threads of one or more threads of at least one primary storage application executing on a processing core, even in situations in which one or more threads of one or more other applications are executing on the same processing core.

These and other embodiments advantageously provide a uniform, flexible and extensible framework for prioritization and control. Such arrangements are highly stable and adaptive to different IO patterns and other conditions.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement host devices and/or storage systems incorporating prioritized thread queues will now be described in greater detail with reference to FIGS. 6 and 7. Although described in the context of information processing system 100, these processing platforms may also be used to implement at least portions of other information processing systems in other embodiments.

Figure 6:
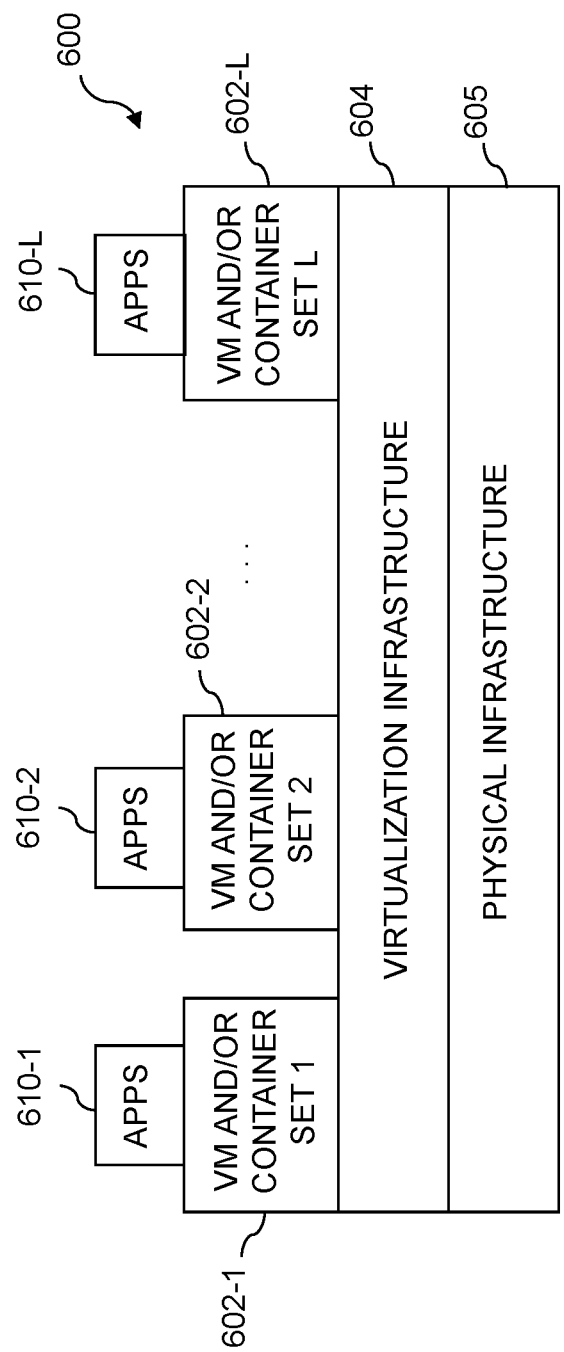
FIGS. 6 and 7 show examples of processing platforms that may be utilized to implement at least a portion of an information processing system in illustrative embodiments.
Figure 7:
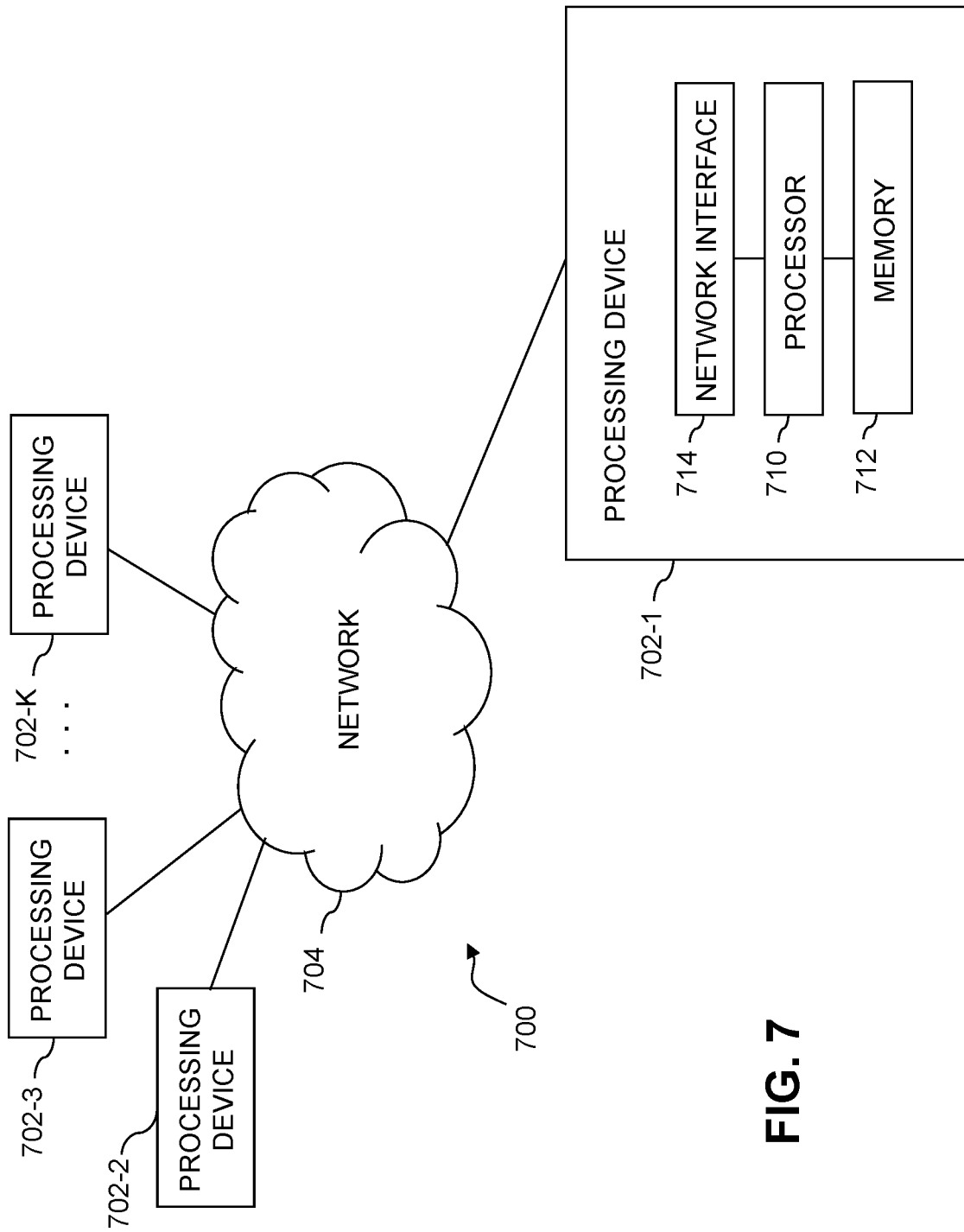

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide or otherwise utilize prioritized thread queues for core threads of a storage system of the type described above using one or more processes running on a given one of the VMs. For example, each of the VMs can implement at least portions of one or more end-to-end QoS mechanisms using prioritized thread queues in the storage system 105 of system 100.

A hypervisor platform may be used to implement a hypervisor within the virtualization infrastructure 604. Such a hypervisor platform may comprise an associated virtual infrastructure management system. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can also provide or otherwise utilize prioritized thread queues for core threads of a storage system of the type described above. For example, a container host device supporting multiple containers of one or more container sets can implement at least portions of one or more end-to-end QoS mechanisms using prioritized thread queues in the storage system 105 of system 100.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network such as a 4G or 5G network, a wireless network such as a WiFi or WiMAX network, or various portions or combinations of these and other types of networks.

The processing device 702-1 in the processing platform 700 comprises a processor 710 coupled to a memory 712.

The processor 710 may comprise a single-core or multi-core CPU, a microprocessor, a microcontroller, an application-specific integrated circuit (ASIC), a field-programmable gate array (FPGA), graphics processing unit (GPU) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™, or Vblock® converged infrastructure from Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of an end-to-end QoS mechanism using prioritized thread queues as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage nodes, storage devices, storage controllers, processing cores, threads, schedulers, applications, system management logic instances, performance monitoring logic instances, QoS mechanisms, prioritized thread queues and other components. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device comprising a processor coupled to a memory;
said at least one processing device being configured:
to associate different classes of service with respective threads of one or more applications executing on at least one of a plurality of processing cores of a storage system;
to configure different sets of prioritized thread queues for respective ones of the different classes of service;
to enqueue particular ones of the threads associated with particular ones of the classes of service in corresponding ones of the prioritized thread queues; and
to implement different dequeuing policies for selecting particular ones of the enqueued threads from the different sets of prioritized thread queues based at least in part on the different classes of service;
wherein the threads of the one or more applications executing on at least one of a plurality of processing cores of the storage system comprise different sub-threads of a first thread of a first application executing on a particular one of the plurality of processing cores of the storage system;
wherein each of the sub-threads of the first thread is in a particular one of multiple designated states at a particular point in time, the multiple designated states including a running state, a ready state and a suspended state, and
wherein different ones of the sub-threads that are in the suspended state are enqueued in respective different ones of the prioritized thread queues in order to wait for access to respective corresponding synchronization objects associated with resources of the particular processing core.

2. The apparatus of claim 1 wherein said at least one processing device comprises at least a subset of the plurality of processing cores of the storage system.

3. The apparatus of claim 1 wherein the first application comprises a block-storage application of the storage system and the first thread comprises a truck thread that when executing on the particular processing core is configured to utilize substantially all available processing resources of that processing core.

4. The apparatus of claim 1 wherein associating different classes of service with respective threads of one or more applications comprises assigning designated class tags as attributes of the respective threads wherein different ones of the class tags denote respective different ones of the classes of service.

5. The apparatus of claim 4 wherein said at least one processing device is further configured:
to receive an input-output operation for processing;
to assign a particular one of the class tags to the input-output operation; and
to assign the particular one of the class tags to each of a plurality of threads that are generated in conjunction with the processing of the input-output operation;
wherein the assignment of the particular one of the class tags to the input-output operation is persistent throughout the processing of the input-output operation.

6. The apparatus of claim 5 wherein the processing of the input-output operation is distributed across a plurality of distinct storage nodes of the storage system, and further wherein each such storage node comprises one or more of the plurality of processing cores of the storage system.

7. The apparatus of claim 6 wherein the assigned class tag for the input-output operation is passed from a first one of the storage nodes to a second one of the storage nodes in conjunction with the processing of the input-output operation and is assigned to one or more threads generated in the second storage node for the processing of the input-output operation.

8. The apparatus of claim 1 wherein uniform sets of prioritized thread queues are provided for respective ones of a plurality of different synchronization objects, each of the synchronization objects comprising one or more of a semaphore, a timer, a lock, a barrier, a memory pool and a thread pool, wherein a single non-prioritized thread queue of a given one of the synchronization objects is replaced with multiple thread queues and priority-based selection among the multiple thread queues for the given synchronization object.

9. An apparatus comprising:
at least one processing device comprising a processor coupled to a memory;
said at least one processing device being configured:
to associate different classes of service with respective threads of one or more applications executing on at least one of a plurality of processing cores of a storage system;
to configure different sets of prioritized thread queues for respective ones of the different classes of service;
to enqueue particular ones of the threads associated with particular ones of the classes of service in corresponding ones of the prioritized thread queues; and
to implement different dequeuing policies for selecting particular ones of the enqueued threads from the different sets of prioritized thread queues based at least in part on the different classes of service;
wherein the different sets of prioritized thread queues configured for respective ones of the different classes of service provide different dynamically adjustable latency levels for the threads that are enqueued therein.

10. An apparatus comprising:
at least one processing device comprising a processor coupled to a memory;
said at least one processing device being configured:
to associate different classes of service with respective threads of one or more applications executing on at least one of a plurality of processing cores of a storage system;
to configure different sets of prioritized thread queues for respective ones of the different classes of service;
to enqueue particular ones of the threads associated with particular ones of the classes of service in corresponding ones of the prioritized thread queues; and
to implement different dequeuing policies for selecting particular ones of the enqueued threads from the different sets of prioritized thread queues based at least in part on the different classes of service;
wherein configuring different sets of prioritized thread queues for respective ones of the different classes of service comprises:
determining a number of priority classes;
determining a number of selection indexes for respective ones of the priority classes; and
establishing a particular number of prioritized thread queues based at least in part on the number of priority classes and the number of selection indexes.

11. An apparatus comprising:
at least one processing device comprising a processor coupled to a memory;
said at least one processing device being configured:
to associate different classes of service with respective threads of one or more applications executing on at least one of a plurality of processing cores of a storage system;
to configure different sets of prioritized thread queues for respective ones of the different classes of service;
to enqueue particular ones of the threads associated with particular ones of the classes of service in corresponding ones of the prioritized thread queues; and
to implement different dequeuing policies for selecting particular ones of the enqueued threads from the different sets of prioritized thread queues based at least in part on the different classes of service;
wherein configuring different sets of prioritized thread queues for respective ones of the different classes of service comprises:
determining a number of priority classes;
establishing a set of prioritized thread queues for each of the priority classes; and
assigning weights to respective ones of the sets of prioritized thread queues of the respective priority classes;
wherein the prioritized thread queues within a given one of the sets each have a same priority for selection of threads enqueued therein; and
wherein different ones of the prioritized thread queues in different ones of the sets have different priorities for selection of threads enqueued therein.

12. A computer program product comprising a non-transitory processor-readable storage medium having stored therein program code of one or more software programs, wherein the program code when executed by at least one processing device comprising a processor coupled to a memory, causes said at least one processing device:
to associate different classes of service with respective threads of one or more applications executing on at least one of a plurality of processing cores of a storage system;
to configure different sets of prioritized thread queues for respective ones of the different classes of service;
to enqueue particular ones of the threads associated with particular ones of the classes of service in corresponding ones of the prioritized thread queues; and
to implement different dequeuing policies for selecting particular ones of the enqueued threads from the different sets of prioritized thread queues based at least in part on the different classes of service;
wherein the threads of the one or more applications executing on at least one of a plurality of processing cores of the storage system comprise different sub-threads of a first thread of a first application executing on a particular one of the plurality of processing cores of the storage system;
wherein each of the sub-threads of the first thread is in a particular one of multiple designated states at a particular point in time, the multiple designated states including a running state, a ready state and a suspended state.and
wherein different ones of the sub-threads that are in the suspended state are enqueued in respective different ones of the prioritized thread queues in order to wait for access to respective corresponding synchronization objects associated with resources of the particular processing core.

13. The computer program product of claim 12 wherein associating different classes of service with respective threads of one or more applications comprises assigning designated class tags as attributes of the respective threads wherein different ones of the class tags denote respective different ones of the classes of service.

14. The computer program product of claim 12 wherein the different sets of prioritized thread queues configured for respective ones of the different classes of service provide different dynamically adjustable latency levels for the threads that are enqueued therein.

15. A method comprising:
associating different classes of service with respective threads of one or more applications executing on at least one of a plurality of processing cores of a storage system;
configuring different sets of prioritized thread queues for respective ones of the different classes of service;
enqueuing particular ones of the threads associated with particular ones of the classes of service in corresponding ones of the prioritized thread queues; and
implementing different dequeuing policies for selecting particular ones of the enqueued threads from the different sets of prioritized thread queues based at least in part on the different classes of service;
wherein the threads of the one or more applications executing on at least one of a plurality of processing cores of the storage system comprise different sub-threads of a first thread of a first application executing on a particular one of the plurality of processing cores of the storage system;
wherein each of the sub-threads of the first thread is in a particular one of multiple designated states at a particular point in time, the multiple designated states including a running state, a ready state and a suspended state; and
wherein different ones of the sub-threads that are in the suspended state are enqueued in respective different ones of the prioritized thread queues in order to wait for access to respective corresponding synchronization objects associated with resources of the particular processing core.

16. The method of claim 15 wherein associating different classes of service with respective threads of one or more applications comprises assigning designated class tags as attributes of the respective threads wherein different ones of the class tags denote respective different ones of the classes of service.

17. The method of claim 15 wherein the different sets of prioritized thread queues configured for respective ones of the different classes of service provide different dynamically adjustable latency levels for the threads that are enqueued therein.

18. The method of claim 15 wherein configuring different sets of prioritized thread queues for respective ones of the different classes of service comprises:
determining a number of priority classes;
establishing a set of prioritized thread queues for each of the priority classes; and
assigning weights to respective ones of the sets of prioritized thread queues of the respective priority classes;
wherein the prioritized thread queues within a given one of the sets each have a same priority for selection of threads enqueued therein; and
wherein different ones of the prioritized thread queues in different ones of the sets have different priorities for selection of threads enqueued therein.

19. The method of claim 15 wherein uniform sets of prioritized thread queues are provided for respective ones of a plurality of different synchronization objects, each of the synchronization objects comprising one or more of a semaphore, a timer, a lock, a barrier, a memory pool and a thread pool, wherein a single non-prioritized thread queue of a given one of the synchronization objects is replaced with multiple thread queues and priority-based selection among the multiple thread queues for the given synchronization object.

20. An apparatus comprising:

at least one processing device comprising a processor coupled to a memory;

said at least one processing device being configured:

to associate different classes of service with respective threads of one or more applications executing on at least one of a plurality of processing cores of a storage system;

to configure different sets of prioritized thread queues for respective ones of the different classes of service;

to enqueue particular ones of the threads associated with particular ones of the classes of service in corresponding ones of the prioritized thread queues; and to implement different dequeuing policies for selecting particular ones of the enqueued threads from the different sets of prioritized thread queues based at least in part on the different classes of service;

wherein associating different classes of service with respective threads of one or more applications comprises assigning designated class tags as attributes of the respective threads wherein different ones of the class tags denote respective different ones of the classes of service; and wherein said at least one processing device is further configured:

to receive an input-output operation for processing;

to assign a particular one of the class tags to the input-output operation; and to assign the particular one of the class tags to each of a plurality of threads that are generated in conjunction with the processing of the input-output operation.

\* \* \* \* \*

UNITED STATES PATENT AND TRADEMARK OFFICE
CERTIFICATE OF CORRECTION

PATENT NO. : 11,886,911 B2
APPLICATION NO. : 16/915380
DATED : January 30, 2024
INVENTOR(S) : Vladimir Shveidel et al.

It is certified that error appears in the above-identified patent and that said Letters Patent is hereby corrected as shown below:

In the Claims

Claim 1, Column 31, Line 32, please delete "state, and" and insert therefor -- state; and --

Claim 12, Column 33, Line 61, please delete "state.and" and insert therefor -- state; and --

Signed and Sealed this
Fifth Day of March, 2024

Katherine Kelly Vidal
*Director of the United States Patent and Trademark Office*